(12) United States Patent　　　　(10) Patent No.: US 7,568,169 B2
Lee　　　　　　　　　　　　　　　　　　(45) Date of Patent: *Jul. 28, 2009

(54) METHOD AND ARRANGEMENT FOR A PRIMARY ACTIONS MENU FOR EMAIL APPLICATIONS ON A HANDHELD ELECTRONIC DEVICE

(75) Inventor: Matthew Richard Lee, Belleville (CA)

(73) Assignee: Research In Motion Limited, Waterloo, Ontario (CA)

( * ) Notice: Subject to any disclaimer, the term of this patent is extended or adjusted under 35 U.S.C. 154(b) by 406 days.

This patent is subject to a terminal disclaimer.

(21) Appl. No.: 11/618,590

(22) Filed: Dec. 29, 2006

(65) Prior Publication Data

US 2007/0192743 A1　　Aug. 16, 2007

Related U.S. Application Data

(63) Continuation-in-part of application No. 11/423,837, filed on Jun. 13, 2006.

(60) Provisional application No. 60/773,145, filed on Feb. 13, 2006, provisional application No. 60/773,798, filed on Feb. 14, 2006, provisional application No. 60/773,799, filed on Feb. 14, 2006, provisional application No. 60/773,800, filed on Feb. 14, 2006.

(51) Int. Cl.
　　*G06F 3/048*　　　(2006.01)
　　*G06F 9/00*　　　　(2006.01)
(52) U.S. Cl. .................................... 715/812; 715/864
(58) Field of Classification Search ............... 715/812, 715/816, 811, 758, 752, 829, 841, 847, 864, 715/838, 827, 831, 828
See application file for complete search history.

(56) References Cited

U.S. PATENT DOCUMENTS 5,679,943 A * 10/1997 Schultz et al. ......... 235/472.02

(Continued)

FOREIGN PATENT DOCUMENTS

EP　　　0886414　　　12/1998

(Continued)

OTHER PUBLICATIONS

Mackenzie, I.S. "Text entry for Mobile Computing: Models and Methods", Theory and Practice. Human Computer Interaction, 2002, vol. 17, pp. 147-198. Copyright 2002.

*Primary Examiner*—Steven P Sax
(74) *Attorney, Agent, or Firm*—Novak Druce + Quigg LLP

(57) ABSTRACT

A system and method is disclosed that provides for displaying on the screen of a handheld electronic device, an extended menu or a short menu, which is a subset of the corresponding extended menu. The system and method include a list of email messages associated with an email box being displayed on a screen. If at least one email message is designated through use of the auxiliary user input device and no menu is displayed, the user may initiate an ambiguous request. Various short menus are provided with their respective menu items being dependent and adjustable based upon the position of a cursor on the display page, the currently opened application, and/or the previous selections. Further, a selection from the short menu is capable of displaying the extended menu corresponding thereto.

20 Claims, 15 Drawing Sheets

U.S. PATENT DOCUMENTS

| | | | |
|---|---|---|---|
| 5,951,399 A * | 9/1999 | Burrell et al. | 463/46 |
| 6,061,576 A | 5/2000 | Terrasson | |
| 6,121,468 A * | 9/2000 | Inaba et al. | 549/518 |
| 6,993,362 B1 | 1/2006 | Aberg | |
| 7,000,188 B1 * | 2/2006 | Eustace | 715/716 |
| 7,035,720 B2 | 4/2006 | Taxis | |
| 7,277,088 B2 * | 10/2007 | Robinson et al. | 345/173 |
| 7,340,674 B2 * | 3/2008 | Newman | 715/234 |
| 7,487,469 B2 * | 2/2009 | Toriyama et al. | 715/863 |
| 2002/0142738 A1 | 10/2002 | Jambie | |
| 2002/0167548 A1 | 11/2002 | Murray | |
| 2003/0032455 A1 * | 2/2003 | Watanabe et al. | 455/566 |
| 2003/0064757 A1 | 4/2003 | Yamadera | |
| 2004/0015500 A1 | 1/2004 | Pugliese | |
| 2004/0141011 A1 | 7/2004 | Smethers | |
| 2004/0261031 A1 | 12/2004 | Tuomainen | |
| 2005/0076309 A1 * | 4/2005 | Goldsmith | 715/811 |
| 2005/0125570 A1 | 6/2005 | Olodort | |
| 2005/0229119 A1 * | 10/2005 | Torvinen | 715/864 |
| 2006/0041848 A1 | 2/2006 | Lira | |
| 2006/0184896 A1 * | 8/2006 | Foucher et al. | 715/810 |
| 2007/0074131 A1 * | 3/2007 | Assadollahi | 715/816 |

FOREIGN PATENT DOCUMENTS

| | | |
|---|---|---|
| EP | 1521168 | 4/2005 |
| WO | 2004086211 | 10/2004 |

* cited by examiner

|1|2|3|4|5|6|7|8|9|0|
|---|---|---|---|---|---|---|---|---|---|
|Q|W|E|R|T|Z|U|I|O|P|
|A|S|D|F|G|H|J|K|L| |
|Y|X|C|V|B|N|M| | | |

|1|2|3|4|5|6|7|8|9|0|
|---|---|---|---|---|---|---|---|---|---|
|A|Z|E|R|T|Y|U|I|O|P|
|Q|S|D|F|G|H|J|K|L| |
|W|X|C|V|B|N|M| | | |

|1|2|3|4|5|6|7|8|9|0|
|---|---|---|---|---|---|---|---|---|---|
| | | |P|Y|F|G|C|R|L|
|A|O|E|U|I|D|H|Y|N|S|
| | | |Q|J|K|X|B|M|W|V|Z|

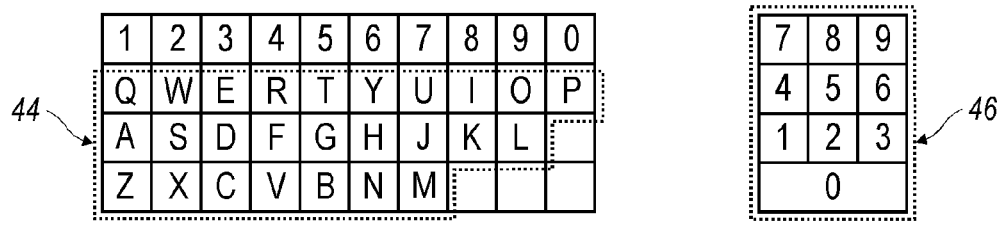
FIG. 11
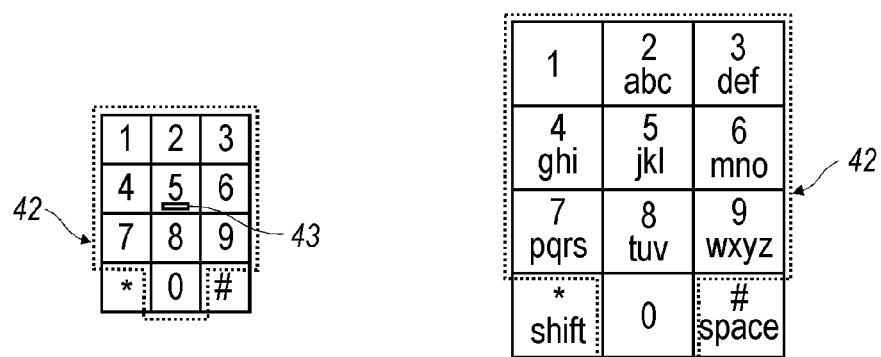
FIG. 12  FIG. 13

METHOD AND ARRANGEMENT FOR A PRIMARY ACTIONS MENU FOR EMAIL APPLICATIONS ON A HANDHELD ELECTRONIC DEVICE

CROSS REFERENCE

The present application is a continuation-in-part application of U.S. application Ser. No. 11/423,837, filed Jun. 13, 2006 and claims the benefit of U.S. Provisional Application Nos. 60/773,145 60/773,798, 60/773,799, and 60/773,800, filed Feb. 13, 2006, Feb. 14, 2006, Feb. 14, 2006, and Feb. 14, 2006, respectively. Said applications are each expressly incorporated herein by reference in their entirety.

FIELD

The present disclosure, in a broad sense, is directed toward handheld electronic devices including those without communication capabilities such as Personal Digital Assistants (PDAs). More specifically, the disclosure is directed toward handheld communication devices that have wireless communication capabilities and the networks within which the wireless communication devices operate. Furthermore, the present disclosure also relates to the user interfaces of the device, as well as the software that controls and runs applications on the device. More particularly, the instant disclosure addresses predictive-type action menus that accommodate and facilitate user interaction and control over the device.

BACKGROUND

With the advent of more robust wireless communications systems, compatible handheld communication devices are becoming more prevalent, as well as advanced. Where in the past such handheld communication devices typically accommodated either voice transmission (cell phones) or text transmission (pagers and PDAs), today's consumer often demands a combination device capable of performing both types of transmissions, including even sending and receiving e-mail. Furthermore, these higher-performance devices can also be capable of sending and receiving other types of data including that which allows the viewing and use of Internet websites. These higher level functionalities necessarily require greater user interaction with the devices through included user interfaces (UIs) which may have originally been designed to accommodate making and receiving telephone calls and sending messages over a related Short Messaging Service (SMS). As might be expected, suppliers of such mobile communication devices and the related service providers are anxious to meet these customer requirements, but the demands of these more advanced functionalities have in many circumstances rendered the traditional user interfaces unsatisfactory, a situation that has caused designers to have to improve the UIs through which users input information and control these sophisticated operations.

Most application programs are menu-driven as opposed to being command-driven. Menu-driven applications provide a list of possible action commands or options from which a user may choose, while command-driven applications require users to enter explicit commands. Thus, menu-driven applications are generally easier for the average user to learn than are command-driven applications. Menus are typically implemented as a list of textual or graphical choices (i.e., menu items) from which a user can choose. Thus, menus allow a user to select a menu item, for example, by pointing to the item with a mouse and then clicking on the item. Examples of other methods of selecting menu items include highlighting an item and then hitting the "return" key or "enter" key, and pressing directly on a menu item through a touch-sensitive screen.

One particularly useful type of menu is a hierarchical menu. Hierarchical menus typically present a parent menu that has selectable menu items. The selection of each menu item normally causes another menu, or submenu, to be displayed next to the currently displayed menu. The submenu has additional menu choices that are related to the selected parent menu item. Also, the parent menu results in the display of the submenu. The depth of a hierarchical menu can extend in this manner to many levels of submenus.

The conventional hierarchical menus generally lay out from left to right across a display screen as menu choices are selected. This menu format provides various advantages such as retaining previous and current menus on the display screen at the same time. This provides a historical menu map as menu selections are made and their corresponding submenus are displayed across the screen. Users can therefore review previous menu selections that have been made while progressing to the most recently displayed menu—thus making it easier to move between different menu items and menu levels.

Although such hierarchical menus provide useful advantages, there are scenarios in which their use is impracticable. One such scenario is when hierarchical menus are used on devices having small display screens. The problems presented when attempting to implement conventional hierarchical menus on small-screen devices have generally discouraged the use of hierarchical menus with such devices.

One problem relates to the layout of conventional hierarchical menus. Hierarchical menus generally lay out across the display screen from left to right. On small-screen devices where the room on the screen is not wide enough to accommodate all of the menus, the menus often lay out across the screen in both directions, from left to right and back again. In this scenario, the menus typically begin to overlap one another, creating various problems. One problem is that the overlapping menus can be confusing to the user. Overlapping menus can make it difficult for a user to discern previous menu selections which can, in turn, make it difficult to determine how to return to previous menus to make different menu selections. Thus, one of the intended benefits of a hierarchical menu can be undermined when the hierarchical menu is implemented on a small-screen device.

Overlapping menus can also create problems with small-screen devices (as well as others) that employ pen-based or stylus-based touch-sensitive screens. With such devices, it is often difficult to maintain contact continuity between menus on the screen when the menus are overlapping. In other words, it is easy to move off of menus with small-screen, touch-based devices. If continuity is lost when moving from one menu to another, menus will often disappear from the screen, causing the user to have to go back and reactivate the menu from a prior menu. This problem becomes worse when using pen-based devices that "track". In the present context, the terminology of "tracking" is used to indicate a situation in which a cursor on the screen follows (tracks) the movement of the pen as the pen moves over the screen even though the pen is not touching the screen. Tracking is lost if the pen is pulled too far away from the screen. Thus, pen-based devices that "track" tend to lose more menus when hierarchical menus are employed.

One method of addressing this issue involves displaying submenus in place of a parent menu, and vice versa, when the appropriate menu items are selected from within the parent menus and submenus. Like a typical hierarchical menu, the depth of a hierarchical in-place menu can extend in this manner to many levels of submenus such as second, third, fourth and fifth levels, with submenus being parent menus to other submenus. Parent menu items selected from within parent menus are displayed within submenus as links back to previous parent menus and are separated from that submenu's items by a divider. For example, parent menu item "Launch App" is from a parent menu and thus includes a forward pointer that indicates a submenu will replace the first parent menu upon selection of "Launch App". In each of the submenus, "Launch App" has a backward pointing arrow that facilitates going back to a previous menu in the hierarchy.

However, another disadvantage of hierarchical menus is the number of menu items presented in each menu. Each of the menus provides the full complement of available menu items. This can be overwhelming for a novice user and irritating to an experienced user. This problem is exacerbated to an extent by the addition of a hierarchical history of parent menus added to the list.

Another approach to the problem of dealing with a full or extended menu, which lists all available menu items at that particular level, uses a radio communication device that provides an extended menu and a short menu—a subset of the extended menu—and the ability to select between the two. The short menu is a dynamic menu in that a user selects menu items from the corresponding extended menu to be included in the short menu.

A disadvantage of this approach is that the novice user will be further overwhelmed with having to build the various short menus. The experienced user may be disinclined from having to go through the initial set-up procedure of the short menus.

Another disadvantage of a hierarchical menu system is the requirement of proceeding through each menu of the hierarchy to reach the desired action or menu item. This process adds various steps that can frustrate users, due to the lack of intuitiveness in getting from point A to point B from the user's point of view.

Accordingly, as the demand for small-screen devices capable of running increasingly complex applications continues to grow, the need exists for a way to implement user control interface menus that overcome the various disadvantages with conventional dropdown-style hierarchical menus.

BRIEF DESCRIPTION OF THE DRAWINGS

Exemplary methods and arrangements conducted and configured according to the advantageous solutions presented herein are depicted in the accompanying drawings wherein:

FIG. 10b illustrates an exemplary QWERTZ keyboard layout;

FIG. 10c illustrates an exemplary AZERTY keyboard layout;

FIG. 10d illustrates an exemplary Dvorak keyboard layout;

FIG. 11 illustrates a QWERTY keyboard layout paired with a traditional ten-key keyboard;

FIG. 12 illustrates ten digits comprising the numerals 0-9 arranged in a telephone keypad configuration, including the * and # flanking the zero; and FIG. 13 illustrates a numeric phone key arrangement according to the ITU Standard E.161 including both numerals and letters.

DETAILED DESCRIPTION

Figure 2:
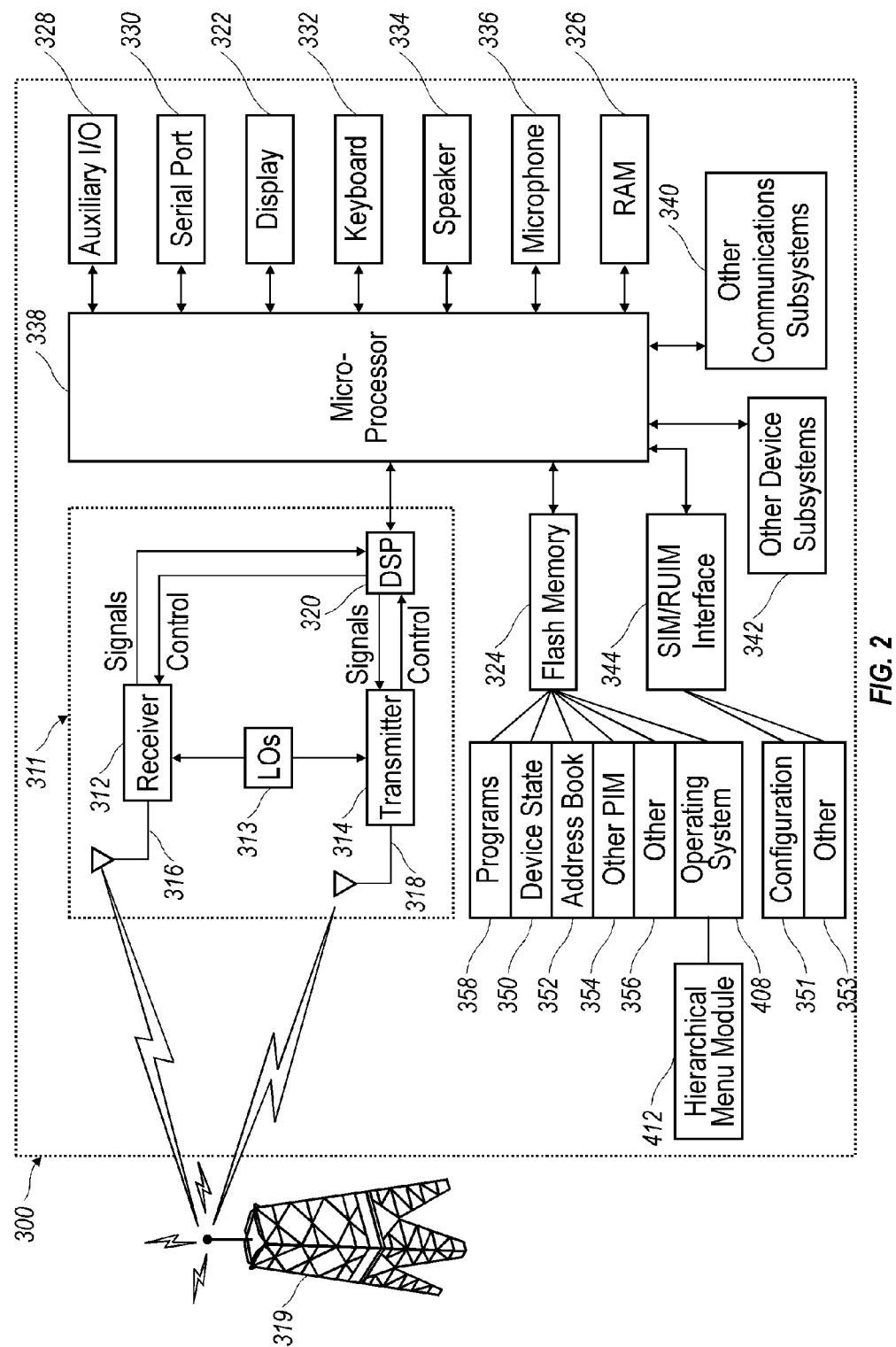
FIG. 2 is a block diagram representing a wireless handheld communication device interacting in a communication network.

An exemplary handheld electronic device 300 and its cooperation in a wireless network 319 is exemplified in the block diagram of FIG. 2. This figure is exemplary only, and those persons skilled in the art will appreciate the additional elements and modifications necessary to make the device 300 work in particular network environments.

The block diagram of FIG. 2, denotes the device's 300 inclusion of a microprocessor 338 that controls the operation of the device 300. A communication subsystem 311 performs all communication transmission and reception with the wireless network 319. The microprocessor 338 further connects with an auxiliary input/output (I/O) subsystem 328, a serial port (preferably a Universal Serial Bus port) 330, a display 322, a keyboard 332, a speaker 334, a microphone 336, random access memory (RAM) 326, and flash memory 324. Other communication subsystems 340 and other device subsystems 342 are generally indicated as being functionally connected with the microprocessor 338 as well. An example of a communication subsystem 340 is that of a short range communication system such as BLUETOOTH® communication module or an infrared device and associated circuits and components. Additionally, the microprocessor 338 is able to perform operating system 408 functions and preferably enables execution of software applications on the communication device 300.

The included auxiliary I/O subsystem 328 can take the form of a variety of different navigation tools including a trackball 121 based device, a thumbwheel 221, a navigation pad, or a joystick, just as examples. These navigation tools are preferably located on the front surface of the device 300 but may be located on any exterior surface of the device 300. Other auxiliary I/O devices can include external display devices and externally connected keyboards (not shown).

While the above examples have been provided in relation to the auxiliary I/O subsystem 328, other subsystems capable of providing input or receiving output from the handheld electronic device 300 are considered within the scope of this disclosure. Additionally, other keys may be placed along the side of the device 300 to function as escape keys, volume control keys, scrolling keys, power switches, or user programmable keys, and may likewise be programmed accordingly.

In an exemplary embodiment, the flash memory 324 is enabled to provide a storage location for the operating system 408, device programs 358, and data. The operating system 408 is generally configured to manage other application programs 358 that are also stored in memory 324 and executable on the processor 338. The operating system 408 honors requests for services made by application programs 358 through predefined application program 358 interfaces. More specifically, the operating system 408 typically determines the order in which multiple applications 358 executed on the processor 338 and the execution time allotted for each application 358, manages the sharing of memory 324 among multiple applications 358, handles input and output to and from other device subsystems 342, and so on. In addition, users can typically interact directly with the operating system 408 through a user interface usually including the keyboard 332 and display screen 322. While the operating system 408 in a preferred embodiment is stored in flash memory 324, the operating system 408 in other embodiments is stored in read-only memory (ROM) or similar storage element (not shown). As those skilled in the art will appreciate, the operating system 408, device application 358 or parts thereof may be loaded in RAM 326 or other volatile memory.

In a preferred embodiment, the flash memory 324 contains programs/applications 358 for execution on the device 300 including an address book 352, a personal information manager (PIM) 354, and the device state 350. Furthermore, programs 358 and other information 356 including data can be segregated upon storage in the flash memory 324 of the device 300.

When the device 300 is enabled for two-way communication within the wireless communication network 319, it can send and receive signals from a mobile communication service. Examples of communication systems enabled for two-way communication include, but are not limited to, the GPRS (General Packet Radio Service) network, the UMTS (Universal Mobile Telecommunication Service) network, the EDGE (Enhanced Data for Global Evolution) network, and the CDMA (Code Division Multiple Access) network and those networks, generally described as packet-switched, narrow-band, data-only technologies which are mainly used for short burst wireless data transfer. For the systems listed above, the communication device 300 must be properly enabled to transmit and receive signals from the communication network 319. Other systems may not require such identifying information. GPRS, UMTS, and EDGE require the use of a SIM (Subscriber Identity Module) in order to allow communication with the communication network 319. Likewise, most CDMA systems require the use of a RUIM (Removable Identity Module) in order to communicate with the CDMA network. The RUIM and SIM card can be used in multiple different communication devices 300. The communication device 300 may be able to operate some features without a SIM/RUIM card, but it will not be able to communicate with the network 319. A SIM/RUIM interface 344 located within the device 300 allows for removal or insertion of a SIM/RUIM card (not shown). The SIM/RUIM card features memory and holds key configurations 351, and other information 353 such as identification and subscriber related information. With a properly enabled communication device 300, two-way communication between the communication device 300 and communication network 319 is possible.

If the communication device 300 is enabled as described above or the communication network 319 does not require such enablement, the two-way communication enabled device 300 is able to both transmit and receive information from the communication network 319. The transfer of communication can be from the device 300 or to the device 300. In order to communicate with the communication network 319, the device 300 in a preferred embodiment is equipped with an integral or internal antenna 318 for transmitting signals to the communication network 319. Likewise the communication device 300 in the preferred embodiment is equipped with another antenna 316 for receiving communication from the communication network 319. These antennae (316, 318) in another preferred embodiment are combined into a single antenna (not shown). As one skilled in the art would appreciate, the antenna or antennae (316, 318) in another embodiment are externally mounted on the device 300.

When equipped for two-way communication, the communication device 300 features a communication subsystem 311. As is well known in the art, this communication subsystem 311 is modified so that it can support the operational needs of the device 300. The subsystem 311 includes a transmitter 314 and receiver 312 including the associated antenna or antennae (316, 318) as described above, local oscillators (LOs) 313, and a processing module 320 which in a preferred embodiment is a digital signal processor (DSP) 320.

It is contemplated that communication by the device 300 with the wireless network 319 can be any type of communication that both the wireless network 319 and device 300 are enabled to transmit, receive and process. In general, these can be classified as voice and data. Voice communication is communication in which signals for audible sounds are transmitted by the device 300 through the communication network 319. Data is all other types of communication that the device 300 is capable of performing within the constraints of the wireless network 319.

In one respect, the present disclosure is directed toward a method for displaying an abbreviated menu on the screen of a handheld electronic device 300 at the request of the user. Typical examples of such devices include PDAs, mobile telephones and multi-mode communicator devices such as those capable of transmitting both voice and text messages such as email. The method includes displaying a cursor-navigable page on a screen 322 of a handheld electronic device 300. One example would be the text of an open email message 620. Next, the user initiates an ambiguous request for the display of menu options corresponding to the displayed page while a cursor is positioned at a location on the page that is not visually signified for menu display actuation. For instance, with the screen cursor positioned upon the body of the open email message 620, but where there is no visual indicator that the location is one which will cause a menu to be displayed if actuated, an action is taken such as pressing a button on the device 300 that indicates the user's desire to take action with respect to the displayed page (open email message 620). There are several actions which might be taken with respect to the open email message 620, but none has been specified; therefore, the request is termed ambiguous. Responsively, the device 300, under the control of an included microprocessor 338, displays a short menu 624 having a first list of menu items which is a subset of a second list of menu items that make up an extended menu 618 associated with the displayed page. This first list of menu items has been assessed a higher probability for being user-selected or desired than at least some of the remaining items of the second list. This means that there is a long list (the second list) of actions that might be taken when the email message is displayed, but there is also a predefined short subset (the first list) of actions of this long list which have been assessed to be more frequently selected/desired, so it is this short listing of selectable actions that is displayed in response to the user's ambiguous request since one of the available actions on the short list is likely to satisfy the user's need.

In at least one version of the device 300, the user's ambiguous request is made through an auxiliary user input device 328 on the handheld electronic device 300. One example of the auxiliary user input device 328 is a navigation tool, such as a trackball 121, that controls movement of the cursor on the screen 322 of the handheld electronic device 300.

The device 300 may also include an input that issues a non-ambiguous request to display the extended menu 618 associated with the displayed page, and which may be simply constituted by an actuable button or the like.

In order to facilitate usability, it is also contemplated that selectable items on the short listing can include choices to expand the short menu 624 to the extended menu 618, or to close the short menu 624. In order to reinforce the commonality between the extended menu 618 choice on the short list and the dedicated push-button for the long list, each is marked with a similar insignia.

In order to take full advantage of the small screen 322 of the handheld device 300, the short menu 624 is displayed on the screen 322 in place of the displayed page, and preferably fills a substantial entirety of the screen 322.

Benefits of the disclosed hierarchical menu system include the ability to implement a hierarchical menu on devices having varying screen sizes, including small-screen devices. The disclosed hierarchical menu permits the display of one menu at a time. In an almost intuitive manner, the methods disclosed allow the user to make an ambiguous selection to directly open a particular item on a displayed page or to display a short menu 624 of items typically used with a displayed page. This reduces user confusion and enhances usability of the system. By using a "menu" item on the short menu 624 or a menu key 606, the user always has the option to view the extended menu 618 associated with the displayed page. By using a "back" menu item or key 608, the user can navigate to previously displayed menus within the string of historically selected menus without cluttering the displayed menus with such historical items.

The menuing task is generally performed by a menuing subsystem or hierarchical menu module 412 of an operating system 408 executing on a handheld electronic device 300. Accordingly, as illustrated relative to the handheld electronic device 300 of FIG. 2, a hierarchical menu module 412 is implemented as part of the operating system 408. In general, the module 412 is configured to receive menu calls from various applications 358 and to service those calls by displaying a menu on a display screen 322 according to the parameters provided by the application 358 making the menu call. Although module 412 is illustrated as being part of operating system 408, it is noted that the module 412 might also function as a stand-alone module 412 stored in memory 324 and executable on a processor 338. In general, although the functioning of module 412 as part of operating system 408 is preferred, it is not intended as a limitation regarding its implementation by a handheld electronic device 300.

In addition to managing typical menuing functions, the hierarchical menu module 412 implements a hierarchical menu in accordance with application programs 358 that support hierarchical menus. Thus, for applications 358 designed to provide hierarchical menus, hierarchal menu module 412 is configured to implement those hierarchical menus as hierarchical menus with ambiguous selection. The implementation of a hierarchical menu as a hierarchical menu with ambiguous selection can occur automatically for any application 358 making a hierarchical menu call to operating system 408. Alternatively, it can occur based on a specific request from an application 358 to implement the hierarchical menu as a hierarchical menu with ambiguous selection. Thus, handheld electronic device 300 manufacturers can configure the devices to automatically provide hierarchical menus which facilitate application developers. This enables application developers to design hierarchical menus, both extended 618 and short 624, in a typical manner without making any changes to their application 358 source code. Alternatively, handheld electronic device 300 manufacturers can configure devices 300 to provide hierarchical menus with ambiguous selection by default, or upon request for application 358 developers. This enables application 358 developers to design hierarchical menus in a typical manner and further allows them to determine if application 358 menus will be implemented as hierarchical menus with ambiguous selection by making a simple selection through their application 358 source code to identify what action should occur in response to an ambiguous selection and populate short menus 624 with preferably those actions, tasks or other commands most commonly used with respect to the displayed page on the screen 322.

Referring to FIGS. 1, 3*a*, 3*b*, 4, and 5*a*-5*e*, the following is a discussion and comparison of the use of the extended 618 and short 624 menus on the handheld electronic device 300.

Figure 1:
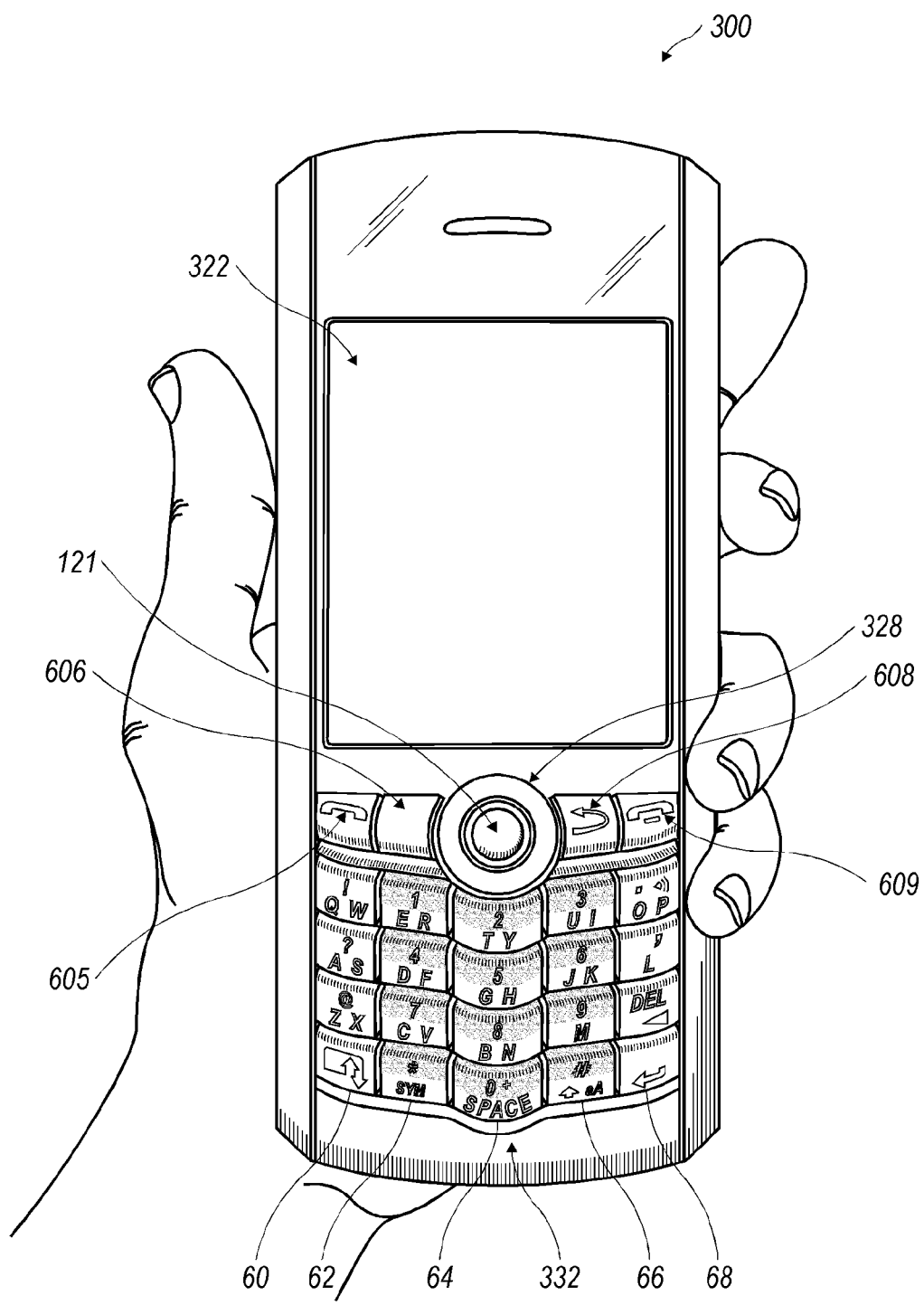
FIG. 1 depicts a handheld communication device cradled in the palm of a user's hand.

In the embodiment depicted in FIG. 1, the device 300 has a first input controller, which is preferably an auxiliary I/O subsystem 328 having a depressible rolling member or trackball 121, which is used to access the short menu 624. The handheld device 300 also has a second input controller, in this case menu key 606, which is used to access the applicable extended menu 618. These menus 618, 624 are based on the interface principle of see and click. In this manner, users do not have to remember commands or options because they can view these options at any time.

FIG. 1 also depicts a display screen 322 and keyboard 332. The display screen 322 serves as a user interface (UI) visually presenting information to the user. The trackball 121 and the menu key 606 are part of the input portion 604 (not shown in FIG. 1). To the right of the trackball 121 is a back key 608, which is used to back-up through previous screens or menus displayed on the display screen 322.

Figure 3A:
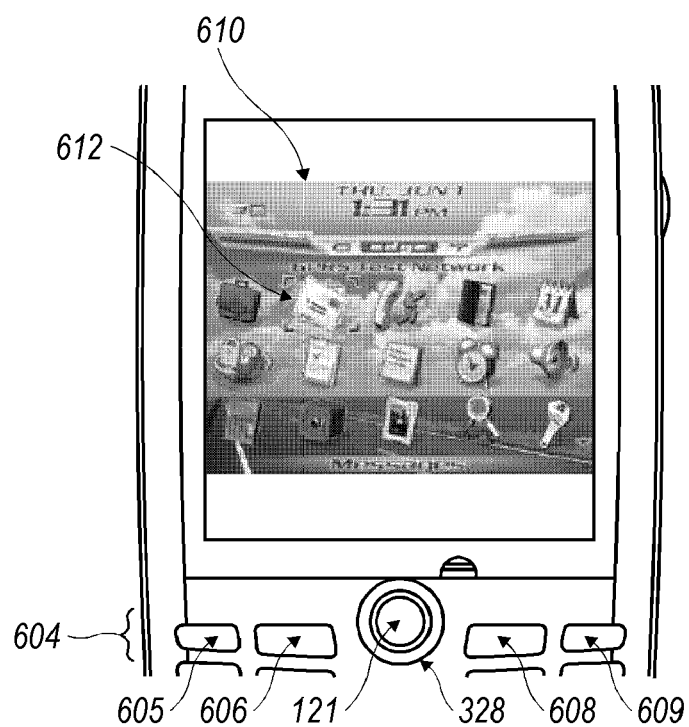
FIG. 3a is a device-displayed home screen which shows a set of icons representing various applications available on the device and the email icon is selected.
Figure 3B:
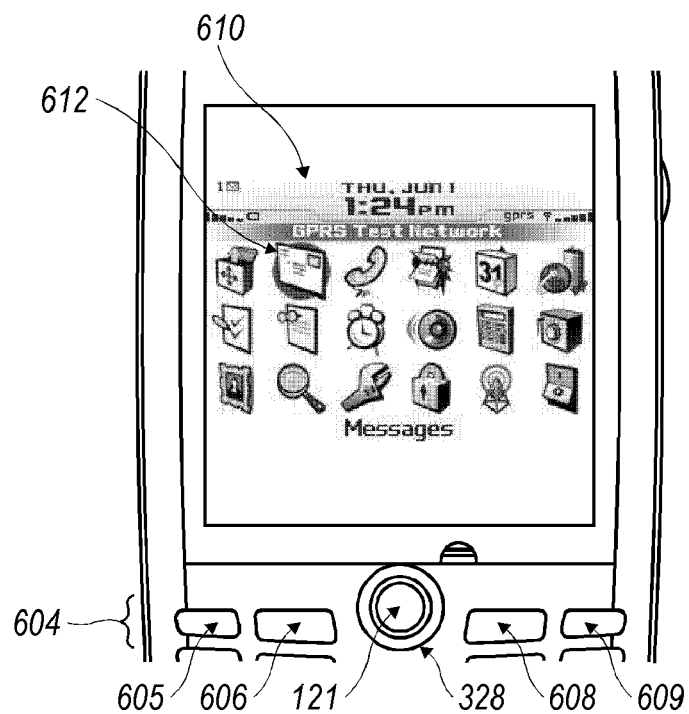
FIG. 3b is a device-displayed home screen which shows another set of icons representing various applications available on the device and the email icon is selected.

The initial screen for the device 300 is a home screen 610. Two examples of a home screen 610 are shown in FIGS. 3*a* and 3*b*, which show different sets of icons representing various applications 358 that are available on the device 300. The user can perform desired high-level activities from the home screen 610, and within an application 358 explore and access functionality of the selected application 358.

The menu key or button 606 is to the left of the trackball 121 and activates an extended menu 618 that lists actions likely desirable relative to the presently displayed screen 610. The menu key or button 606 provides a consistent location where the user can look for commands. Each application 358 has its own extended menu 618 consisting of application-specific menus.

Clicking (depressing) the trackball 121 when an icon on the home screen 610 is highlighted opens the application 358, preferably to a common page used by users. For example, if the email message's icon 612 is highlighted, then a page listing the messages 616 will open (See FIG. 5*a*). When not on the home screen 610, but while a page of an application 358 is displayed without a menu showing, clicking the trackball 121 is referred to as an ambiguous selection since several commands may apply in that circumstance. This ambiguous selection will cause a short menu 624 to appear on the display screen 322. The short menu 624 contains a list of menu items that are preferably the most commonly used commands in the present screen context. These short menus 624 again are based on the interface principle of see and click. The options or menus change according to the task at hand.

The items shown in these short menus 624 preferably are those that a user performs frequently. In other embodiments, the short menu 624 is selected based on either predefined user or programmer preference. These short menus 624 are preferably correctly organized, worded clearly, and behave correctly in order for the user to understand what options they should expect to see, and how to access the additional functionality specific to the selected application 358.

Figure 5A:
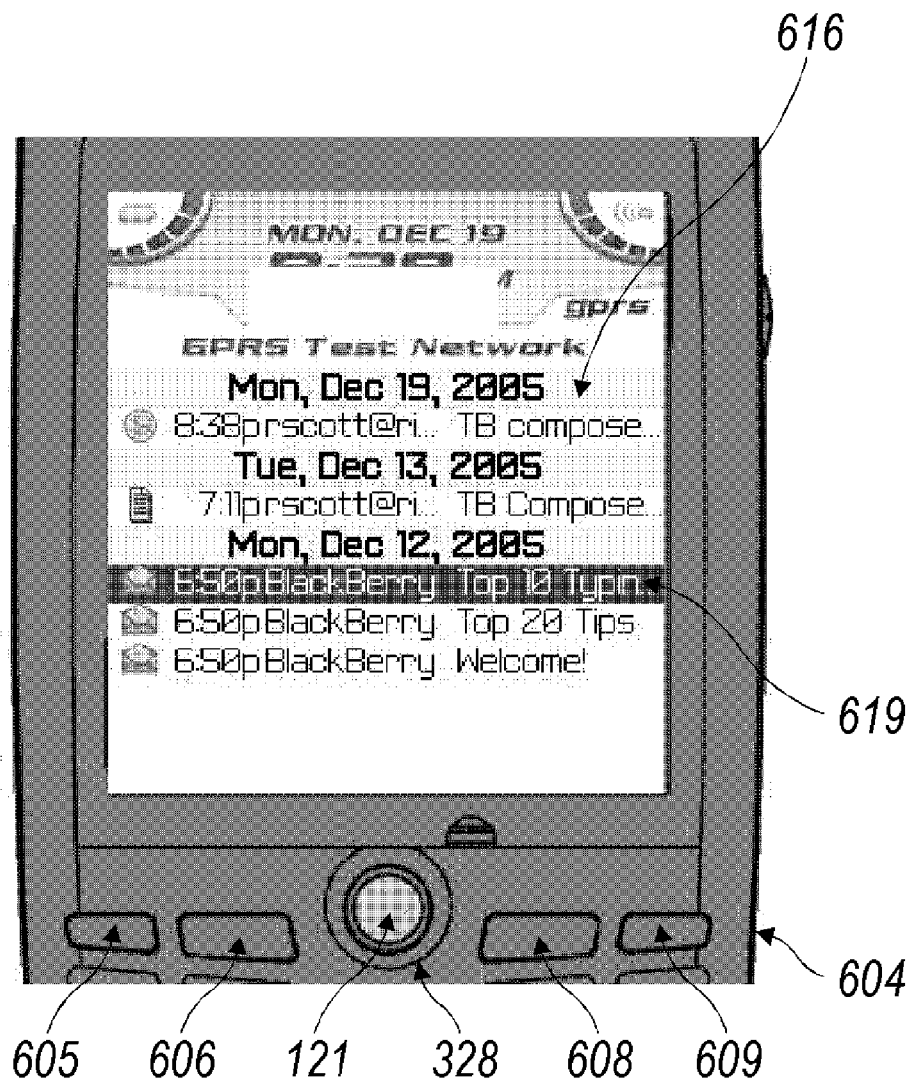
FIG. 5a is a device-displayed email listing.
Figure 5B:
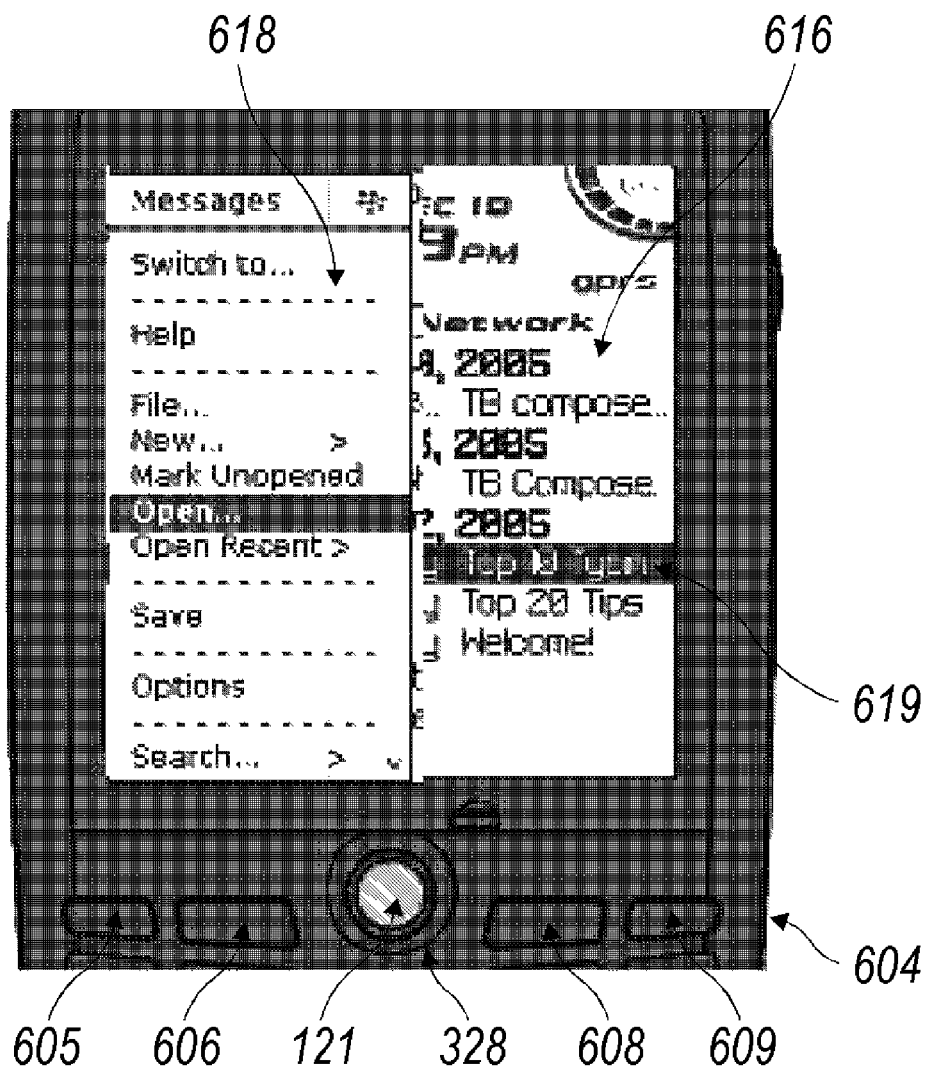
FIG. 5b is a device-displayed extended menu relevant to the email listing.
Figure 5C:
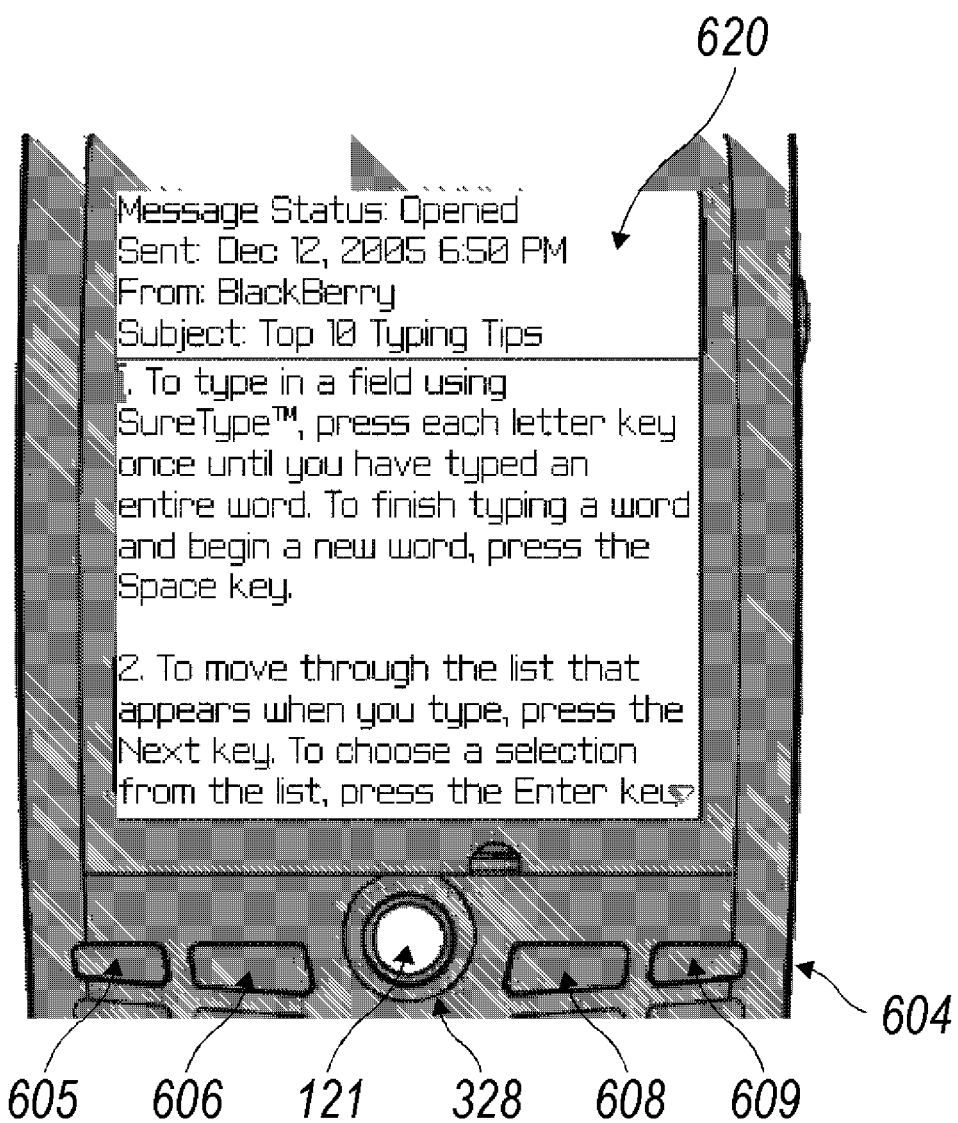
FIG. 5c is a device-displayed open message chosen from the email listing.
Figure 5D:
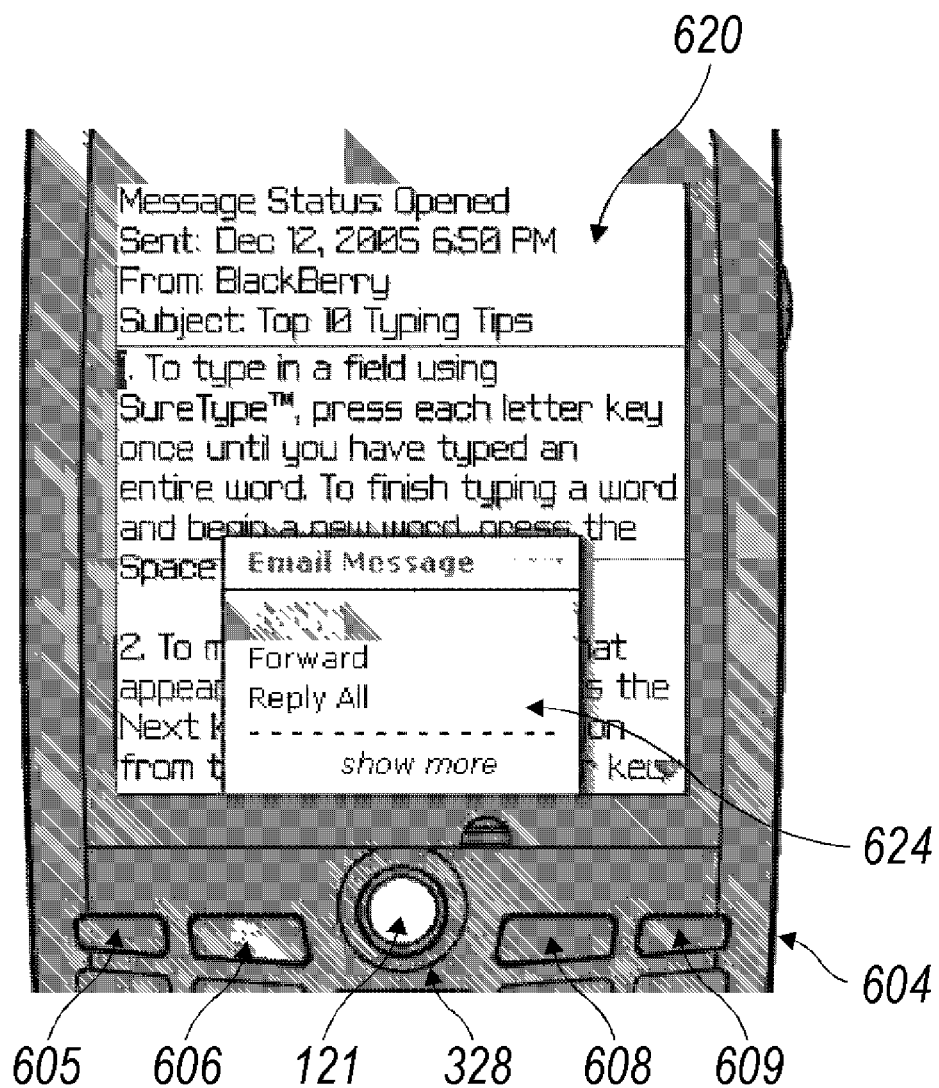
FIG. 5d is a user requested short menu that presents frequently desired actions relative to an open email message.
Figure 5E:
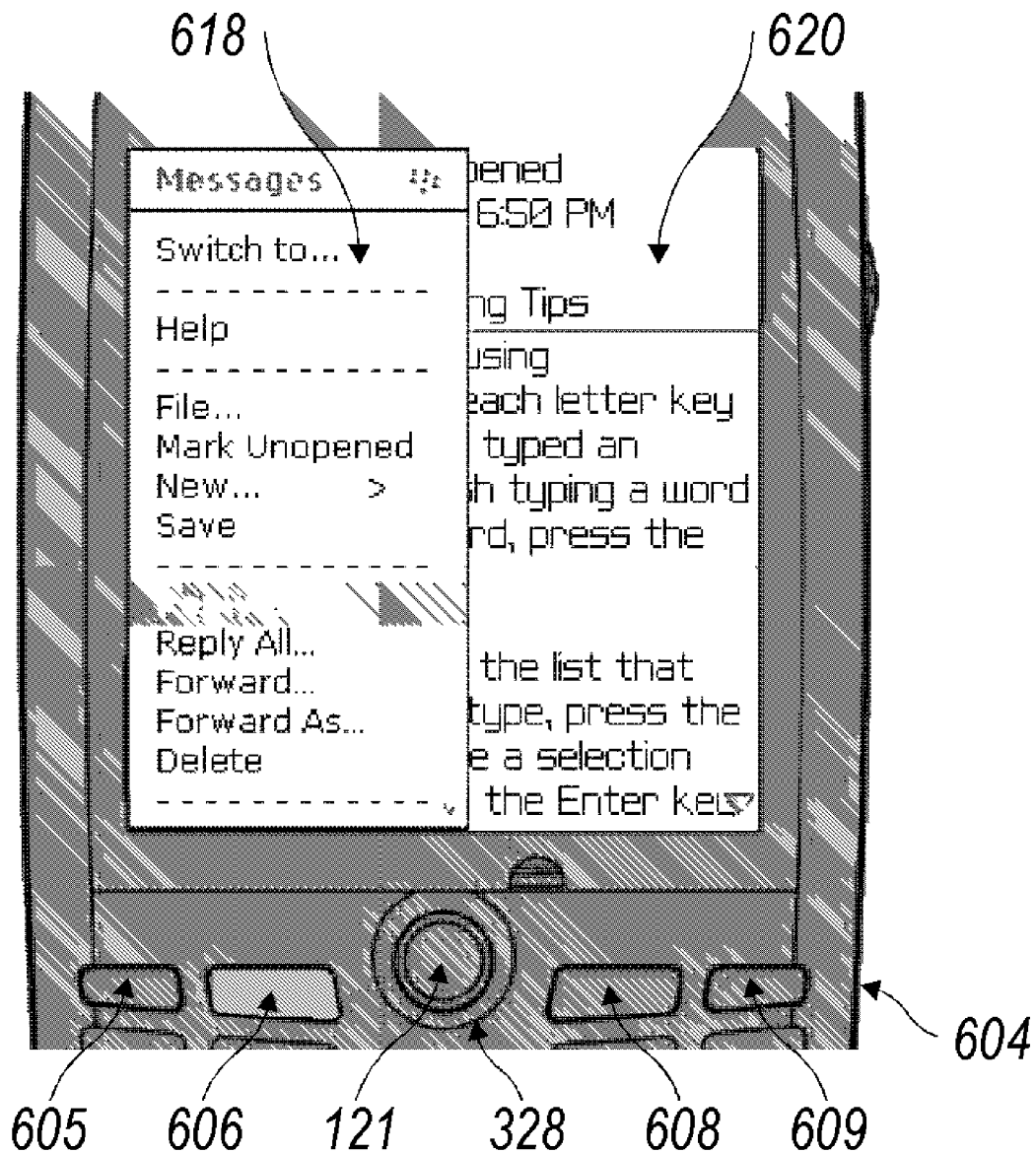
FIG. 5e is an extended menu that presents further options relevant to an open email message which was displayed based on a user selection of the "show more" option of FIG. 5d.

In at least one embodiment, the items displayed in the short menu 624 are dynamically updated depending upon the user's selection of items from the extended menu 618 (See FIGS. 5*d* and 5*e*). As items are repeatedly selected from the extended menu 618, the menu items are ranked and depending upon their frequency of selection will relatively appear in the short menu 624. The number of items in the short menu 624 is preferably between two and ten items. The items displayed in the short menu 624 can also be user selected in one embodiment.

In another embodiment, the information for the short menu 624 is stored locally as well as at a central location. The transmission of the short menus 624 that are applicable for the particular user is via a communication system as described below. The information stored at the central location allows the user to access that information on multiple devices. This will allow the user to experience identical menus on different devices. This is helpful when a user would like to encounter the same interface, but uses the devices in different ways. The information alternatively may be stored on a memory card and transferred between devices via the memory card.

For purposes of example, in the following disclosure, the use of the menus 618, 624, trackball 121 and keys are discussed relative to the use of an email message application 358.

Figure 4:
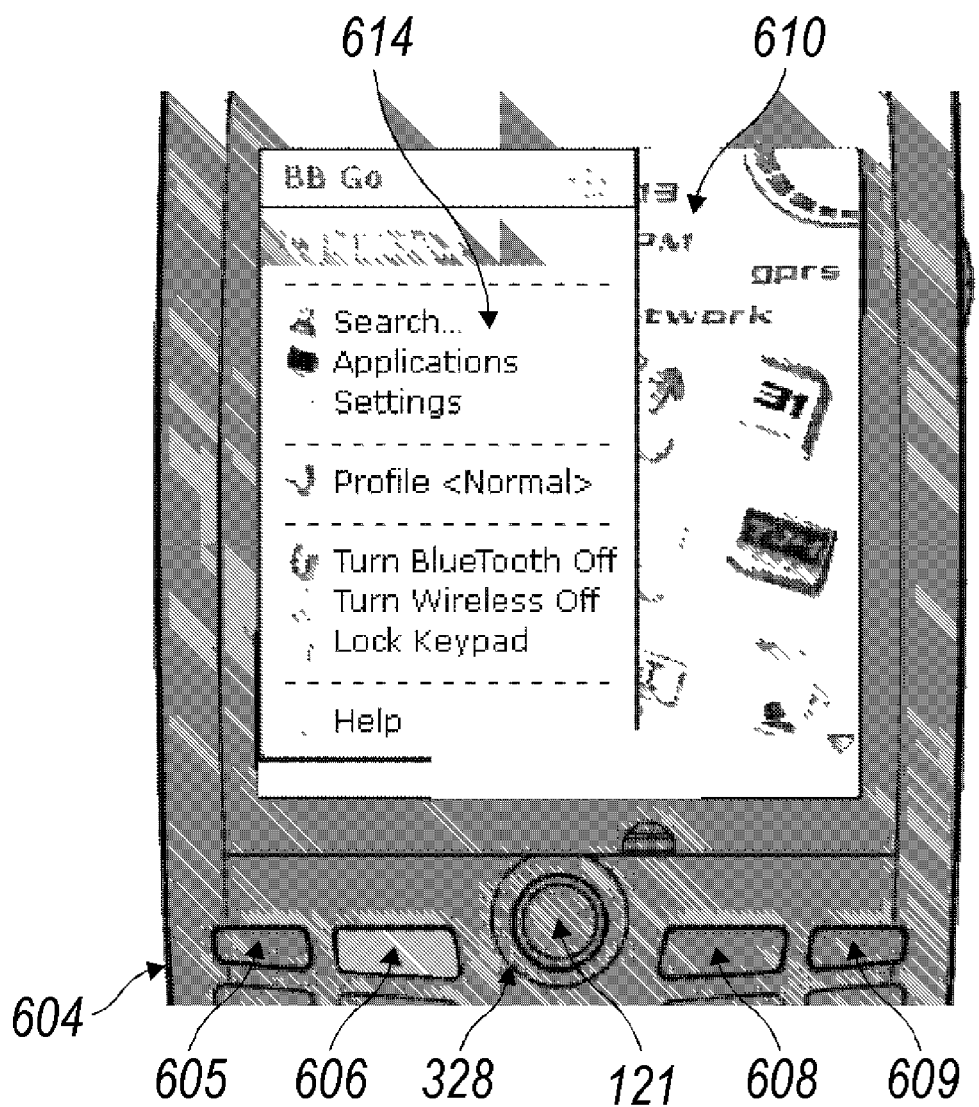
FIG. 4 is a device-displayed high level extended menu associated with the email icon on the home screen.

Initially, the user uses the trackball 121 to scroll to the desired application 358. In this case, it is the email messaging application 358. In FIGS. 3*a* and 3*b*, the email icon 612 (a letter envelope) is highlighted in a conventional manner, for example, with a frame as shown in FIG. 3*a* or with a highlighted background as depicted in FIG. 3*b*. Then, the menu key 606 is activated by depressing or "clicking" it, which brings up a high level extended menu 614 as shown in FIG. 4. This menu 614 can include the following menu items:

Compose...
---------------
Search...
Applications
Settings
---------------
Profile < Normal >
---------------
BlueTooth On/Off
Wireless On/Off
Key Lock On/Off
---------------
Help For example, clicking on "Compose" would initiate the address book function 352 and allow the user to select an addressee, select the type of message (email, SMS, IM, etc.) and proceed with the composition of a message. However, for the present example, the user desires to open their email message mailbox and view a list of email messages 616. In another embodiment, the menu includes the option "close," which will close the menu. Preferably, the option to close the menu is listed near the bottom. This enables closing of the menu without requiring the use of an additional key to close the menu.

To do this, the menu key 606 is clicked again and the high level extended menu 614 for the email messaging application 358 is displayed, as shown in FIG. 4. If the menu item "Open" is not already highlighted, then the trackball 121 is used to scroll to this item such that it is highlighted. Once the menu item "Open" is highlighted, the trackball 121 is clicked. A list of email messages 616 is displayed on the screen 322 as shown in FIG. 5*a*.

In order to open and read a particular email message, the trackball 121 is then used to scroll to the desired email message 619 in the displayed list causing it to be highlighted. The menu key 606 is clicked and the extended menu 618 is displayed, for example as shown in FIG. 5*b*. If the menu item "Open" is not already highlighted, then the trackball 121 is used to scroll to this item such that it is highlighted. Once the menu item "Open" is highlighted, the trackball 121 is clicked. The desired message 620 is displayed on the display screen 322 as shown in FIG. 5*c*.

The user then decides what to do as a result of reading the message. To perform the next action, the user clicks the menu key 606 and another extended menu 618 appears as shown in FIG. 5*e*. If not already highlighted, the user then scrolls to the desired menu item using the trackball 121 until the desired menu item (action or task) is highlighted. Then, the user clicks the trackball 121 to activate the desired action or task.

The use of the short menu 624 usually requires fewer clicks to perform the same action as compared to the use of solely the extended menus 618. For example, the following is an embodiment using the ambiguous selections and/or short menus 624 to open the email messaging application 358 and to open a particular email message.

Starting from the home screen or menu 610, the trackball 121 is used to scroll to and highlight the email message icon 612 as shown in FIGS. 3*a* and 3*b*. Clicking the trackball 121 directly opens the list of messages 616 as shown in FIG. 5*a*. The trackball 121 is clicked while no menu is present and this action is an ambiguous selection since more than one action or task is possible. This ambiguous selection while on the home screen 610 and with the email icon 612 highlighted is treated by the hierarchal menu module 412 as a direction or command to open the highlighted application 358. In this embodiment, it is believed that the user is attempting to perform the task of opening the email application program 358 and the hierarchal menu module 412 is programmed accordingly. Displaying the list of emails 616, as shown in FIG. 5*a*, is the action or task believed to be the most common desired, and thus to the user, the procedure appears intuitive. Such ambiguous selection for other application 358 is preferably programmed with the most common desired task or action for the selected application 358.

In this regard, it is appreciated that opening the email message list 616 took two clicks and one scrolling using the extended menus 618, whereas with the ambiguous selection routine of the hierarchal menu module 412 this was reduced to just a single click.

Now, with the email message list 616 on the display 322, the user scrolls to the desired email message, clicks with the trackball 121, and the desired open email message 620 is displayed on the screen 322, as shown in FIG. 5c. Again, there is no menu on the display 322 and the action is an ambiguous selection since more than one action or task is possible.

In this regard, it is also appreciated that opening a desired email message took two clicks and possibly a scroll, whereas with the ambiguous selection routine of the hierarchal menu module 412, this was reduced to just a single click.

While the user is viewing the open email message 620 on the display screen 322 after having read its contents, the user clicks the trackball 121 making another ambiguous selection, again since no menu is on the display screen 322 and more than one action or task is possible. This ambiguous selection causes the menu program to display a short menu 624, preferably of menu items corresponding to actions or tasks commonly performed by users at that point. In this embodiment, a short menu 624 is shown in FIG. 5d, and contains the actions or tasks—"Reply", "Forward" and "Reply All." The user then decides which action or task to perform and scrolls to it and clicks the trackball 121. Novice and experienced users alike benefit from the reduction in information displayed on the short menu 624 through the removal of less commonly used tasks. The short menu 624, as shown in FIG. 5d, contains a title "Email Message," thus providing information about the application 358 that is associated with the menu. Likewise, other titles for other menus would be appropriate at times when menus are displayed in connection with other applications 358. In other embodiments, the short menu 624 features the menu item "close" in addition to those items described above.

Thus, the short menu 624 provides convenient access to the high level, most often-used commands associated with an application 358. The short menu 624 that is displayed can also depend on the position of the cursor within the displayed page. The short menu 624 can be considered as a shortcut to commands that make sense to the task at hand. In some cases, when on the home screen 610, rather than opening the indicated application 358, a short menu 624 can be displayed with the more common subset of actions, tasks or other commands by affecting an ambiguous request by clicking on a highlighted application 358 icon on the home screen 610.

If the desired action or task is not listed on the short menu 624, the user can click the menu key 606 to view the extended menu 618, such as shown in FIG. 5e using the exemplary email messaging scenario. Alternatively, the short menu 624 can have a menu item that allows the user to scroll to and select the item as shown in FIG. 5d. Once that menu item has been selected, then the extended menu 618 replaces the short menu 624. For example, the short menu 624 in FIG. 5d has a menu item "show more" for this purpose. The name of this menu item can be any other that conveys a similar meaning, such as "Full" or "Extended" or an icon that is used by the device 300 provider and identified in its literature to have that meaning. Likewise, the menu key 606 in a preferred embodiment features an icon or the like that is shown next to the "show more" menu item.

Other applications of short menus 624 are possible as well. Another example of the use of a short menu 624 is when the device 300 features soft keys that can be user customized. Since these soft keys are user customizable, a short menu 624 can be activated when the soft key is activated two times without any additional user input and/or within a predefined time period. The short menu 624 would present options to change the soft key to bring up different program options. The short menu 624 likewise could feature the extended menu 618 features and close options mentioned above.

Example methods for implementing an embodiment of a hierarchical menu and ambiguous selection will now be described with primary reference to the flow diagram of FIG. 6. The methods apply generally to the exemplary embodiments discussed above with respect to FIGS. 3a, 3b, 4, 5a-5e. The elements of the described methods may be performed by any appropriate means including, for example, by hardware logic blocks on an ASIC or by the execution of processor-readable instructions defined on a processor-readable medium.

A "processor-readable medium," as used herein, can be any means that can contain, store, communicate, propagate, or transport instructions for use or execution by a processor 338. A processor-readable medium can be, without limitation, an electronic, magnetic, optical, electromagnetic, infrared, or semiconductor system, apparatus, device, or propagation medium. More specific examples of a processor-readable medium include, among others, an electrical connection (electronic) having one or more wires, a portable computer diskette (magnetic), a random access memory (RAM) (magnetic), a read-only memory (ROM) (magnetic), an erasable programmable-read-only memory (EPROM or Flash memory), an optical fiber (optical), a rewritable compact disc (CD-RW) (optical), a portable compact disc read-only memory (CDROM) (optical), and a solid state storage device (magnetic; e.g., flash memory).

Figure 6:
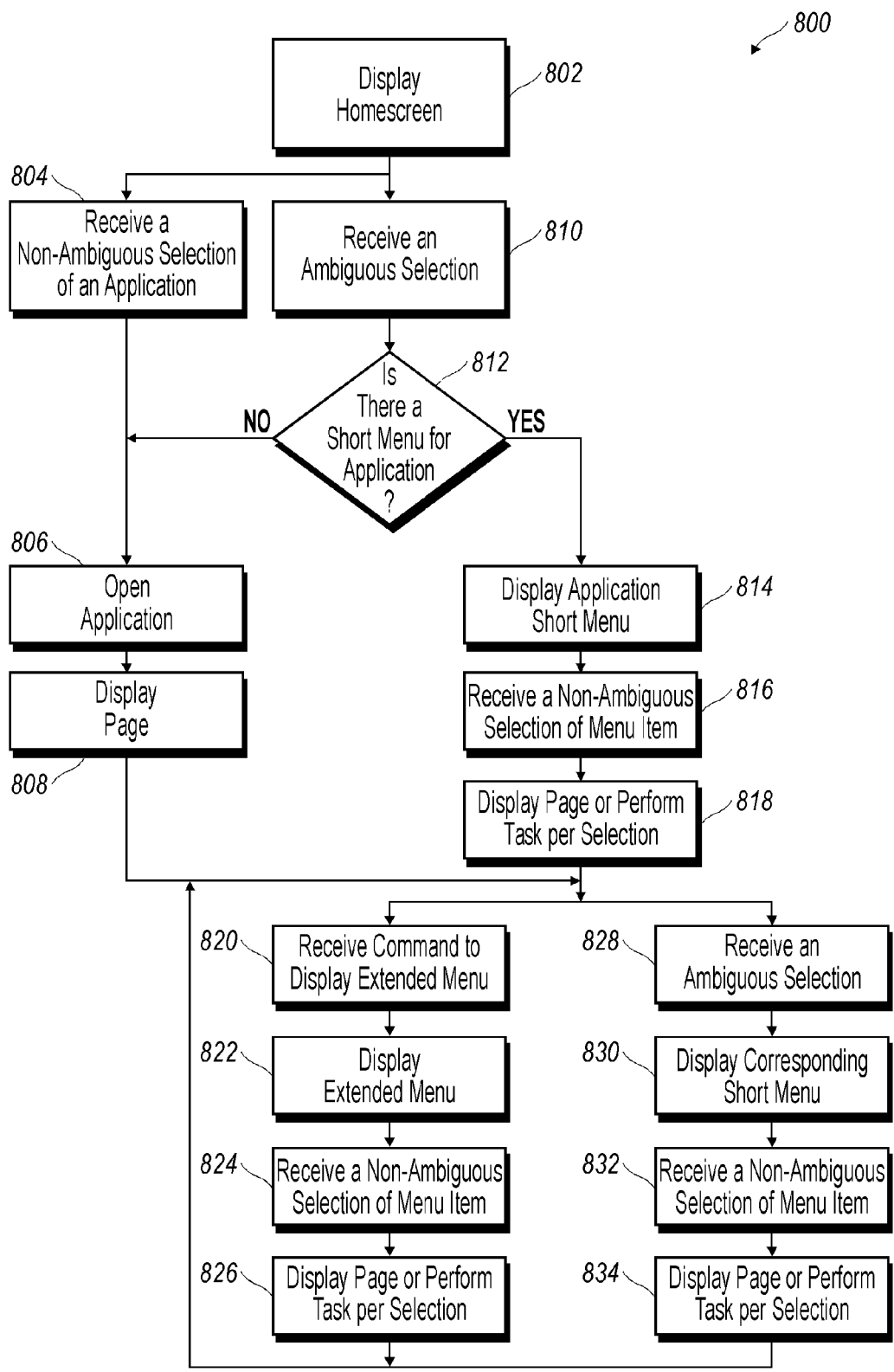
FIG. 6 is a flow chart representative of a hierarchical menu process.

FIG. 6 illustrates an exemplary method 800 for implementing a hierarchical menu with ambiguous selection on a handheld electronic device 300, PDA, or other similar device having a small display screen 322. The method 800 describes a hierarchical menu process that could continue well beyond the number of submenus that are discussed in the method itself Thus, the extent of method 800 is not intended as a limitation. Rather, the extent of method 800 is intended to generally express the manner by which a hierarchical menu with ambiguous selection can be implemented in lesser and greater degrees of size and complexity.

Initially, a home screen 802 is displayed on the display screen 322. The user scrolls to a particular application 358 using a navigation tool. The user can then depress the menu key 606 to initiate a non-ambiguous selection 804 of that particular application 358 that is received by the method 800. The method 800 then causes the selected application 358 to open an application 806 and display a page 808 on the display screen 322. Alternatively, the user can make an ambiguous selection 810. For example, if the navigation tool is a trackball 121 having a depressible rolling member, the user depresses the rolling member when no menu is present. The method 800 receives the ambiguous selection 810 and then must determine whether there is a short menu for this application 812. If there is no short menu 624, then the method 800 causes the application to open 806 and display a page 808. If there is a short menu 624, then the method causes the display of the applications short menu 814. The user then scrolls to the desired menu item and depresses the rolling member. The method 800 receives a non-ambiguous selection of the menu item 816 and either displays a page or causes the computer to perform the task selected 818.

Once a page is displayed 808, 818, the user again has two choices. The user can depress the menu key 606 and the method 800 receives a command to display an extended menu 820 corresponding to the displayed page. The method 800 then displays that extended menu 822. The user then scrolls to a particular menu item and depresses the rolling member which causes the method 800 to receive a non-ambiguous selection of the menu item 824. The method 800 then displays a page or performs the task per the selection 826. Alternatively, the user can depress the rolling member with no menu displayed causing an ambiguous selection 828. The method 800 receives this ambiguous selection 828 and causes the display of a corresponding short menu 830, or the method 800 can be programmed to perform a particular task that is the most common for the displayed page (not shown in FIG. 6). With the short menu 624 displayed, the user can then scroll to the desired menu item and depress the rolling member to generate a non-ambiguous selection 832. The method 800 receives the non-ambiguous selection of the menu item 832 and causes the display of a page or performance of a task per the selection 834.

If the user is presented with another displayed page, the user can repeat steps 820 through 826 or 828 through 834, depending on whether the user uses an extended menu 618 or short menu 624, respectively.

Once the particular activity is completed, the user can use the back key 608 to navigate back through the various pages displayed until the user reaches a page from which the user can perform another activity or select another application 358 upon reaching the home screen 802. The device can be equipped with an escape key 608 to go to the home screen 802 directly. Alternatively, an ambiguous selection to display a short menu or a non-ambiguous selection can be made to display a short or extended menu that has a home screen menu item.

According to the present disclosure, applications of the short menu 624 described above in relation to email exemplarily take the form of the several embodiments described hereinbelow. One such embodiment takes the form of a handheld electronic device 300 that is programmed to display, upon user request, an abbreviated menu of user-selectable actions 1000 relative to one or more designated emails 619 signified on the display screen 322 of the device 300. The abbreviated menu addressed in the following embodiment(s) has also been described as a short menu 624, the details of which are further explained below. In these regards, a user-selectable action 1000 refers to an action that the user wishes to be taken relative to a designated message 619, for example, opening a highlighted email. This user-selectable action 1000 can be, for example, indicated by the user through the actuation of an auxiliary input device 328 such as a trackball 121 or thumbwheel 221.

Figure 7:
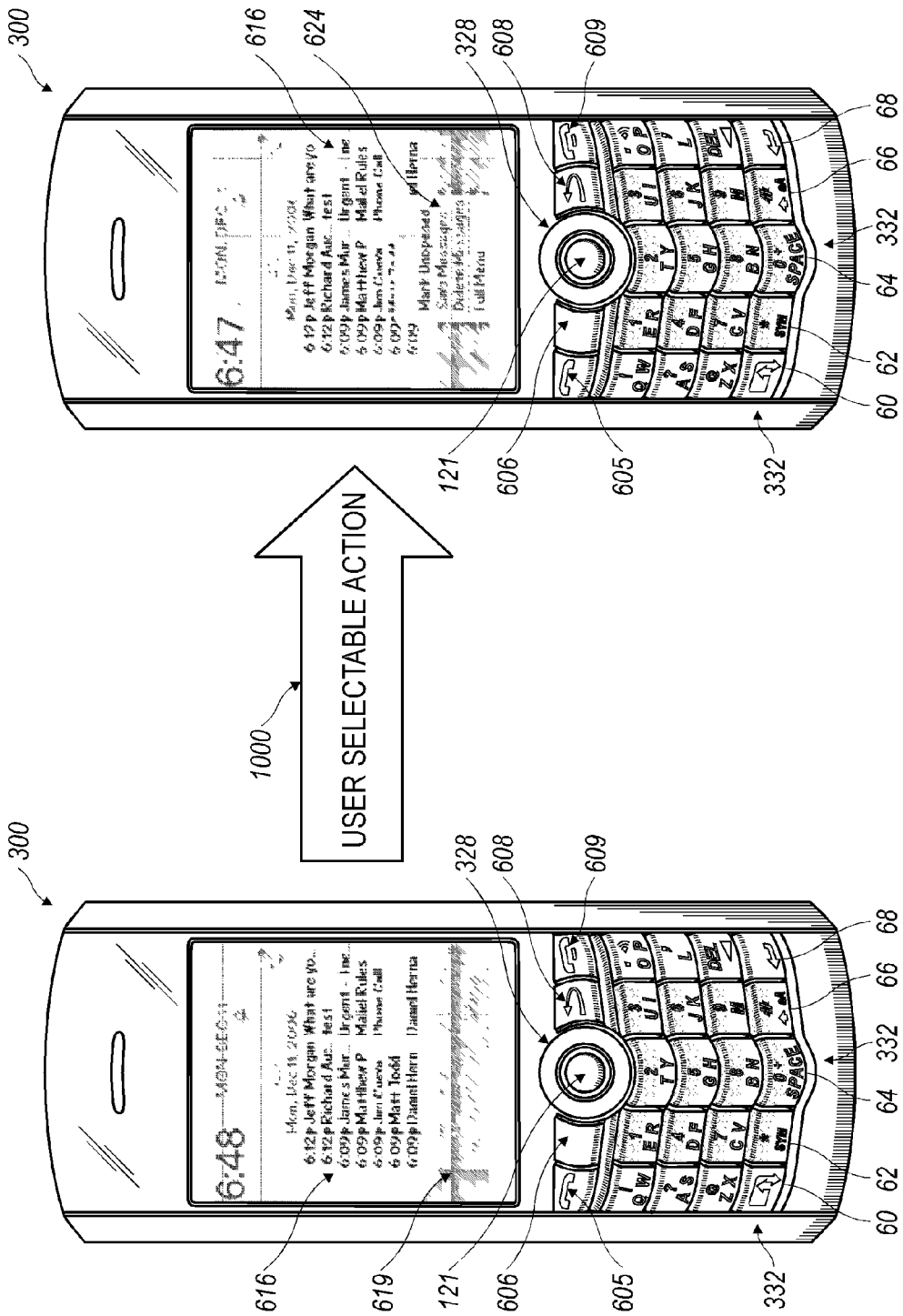
FIG. 7 depicts an expedited menuing system on a handheld electronic device in which a short or abbreviated menu pops-up showing a listing of most likely actions the user may desire to perform, in the illustrated case, relative to one or more designated email messages.

As a general and common starting point, a listing of email messages 616 is displayed on the display screen 322 of the handheld device 300 and the user designates at least one of the email messages 619 for further action or treatment. One exemplary listing of email messages is shown in FIG. 7. This email listing 616 format could be the default screen or a specific view inside the email program. The listing of email messages 616 comes from an email box that is user-accessible via the handheld electronic device 300. The email box in one embodiment is stored on a server and synchronized with the device 300 over the communication network 319 described above. Alternatively, the device 300 retains and stores emails that have been previously synchronized to a local mail box. The user can select messages and move the messages to other email boxes to which the user has access either on the device 300 or on a remote server. If the user moves the email messages to a different folder on the device 300, these changes can later be synchronized with a server that is capable of storing messages, as well as optionally sending and receiving email messages.

In one embodiment, the user of the handheld electronic device 300 designates the email message(s) through the use of an auxiliary input device 328. This auxiliary input device 328 as described above can include a trackball 121, thumbwheel 221, navigation pad, cursor keys and the like. These auxiliary input devices 328 allow the user to designate a desired email message or group of messages through highlighting or some other type of visual designation. This visual designation can include font changes, color changes, bracketing and the like.

As described above, the handheld device 300 contains a microprocessor 338. This microprocessor 338 has a control program, such as an operating system 408 for the device 300 for controlling operation of the handheld electronic device 300. The control program is configured to process an ambiguous request for the display of menu options of user-selectable actions 1000 associated with the designated email message(s) 619 based upon detection of a user menu request. The ambiguous request, as described above, occurs when there are multiple actions that a user might want to take. The control program can determine whether the request is ambiguous depending upon cursor position, such as in this case where an email message(s) has been designated. An example of detection of a user menu request by the control program is when the user depresses/actuates the trackball 121 thereby indicating a request for a list of menu options.

Once the detection of the user menu request has been made, the microprocessor 338 displays an abbreviated menu having a short list 624 of menu options which is a subset of a full menu 618 of options of user-selectable actions available relative the designated email message(s). The user-selectable actions 1000 of the short list 624 of menu options are those options that have been assessed to have a higher probability for being user-selected than at least some of the user-selectable actions 1000 of the full menu 618 of options that are not included in the short list 624 of menu options. Thus, the short list 624 contains items that a user of the handheld device 300 is more likely to use than some of the items shown on the full or extended menu 618. Further details regarding the selection of those items for a short menu 624 are provided above.

In at least one embodiment, the short list 624 of menu options that are displayed when the user makes the menu request comprises (i) file to folder; (ii) mark opened/unopened; (iii) save and (iv) delete. The option 'file to folder' indicates that the user wishes to file the email message(s) to a specified folder on the device 300 or email server. The option to 'mark opened/unopened' allows the user to change the status of the email message(s) to opened or unopened status as desired. The save and delete options will save or delete the designated email message(s). In another embodiment, the short list 624 of menu options consists of (i) file to folder; (ii) mark opened/unopened; (iii) save and (iv) delete while in yet another embodiment, (v) full menu is added to this closed listing of possible actions.

In at least one embodiment, the short menu 624 is sized so that it fills a substantial entirety of the display screen 322. The size of the short menu 624 in relation to the display screen 322 can change depending upon the size of the display screen 322. When the device 300 is sized as described below, the short menu 624 often fills a large portion of the display screen 322. The amount of the display screen 322 that the short menu 624 occupies is contemplated to preferably range between 10% and 70%. Other sizes can also enable the user to be used that easily read the menu while still being able to see the underlying data displayed on the screen 322 as well.

In order to facilitate the entering of text associated with these email messages and the like, a keyboard 332 is located below the display screen 322 and is configured to accommodate textual input to the handheld electronic device 300. This keyboard 332 can either be a full or reduced keyboard 332 as described below. Furthermore, a navigation tool in one embodiment is located essentially between the keyboard 332 and the display screen 322 of the handheld electronic device 300. This navigation tool can be an auxiliary input device including those mentioned above. The navigation tool can further be advantageously widthwise centered on the face of the device 300.

Preferably, the handheld device 300 is sized for portable use and to be pocketed. In one embodiment the handheld electronic device 300 is sized to be cradled in the palm of the user's hand. The handheld device 300 is advantageously sized such that it is longer than wide. This preserves the device's 300 cradlability while maintaining surface real estate for such things as the display screen 322 and keyboard 332. In a development of this embodiment, the handheld electronic device 300 is sized such that the width of the handheld electronic device 300 measures between approximately two and approximately three inches thereby facilitating the device 300 being palm cradled. Furthermore, these dimension requirements may be adapted in order to enable the user to easily carry the device 300.

Furthermore, the handheld electronic device 300 is preferably capable of communication within a wireless network 319. Thus, this device 300 can be described as a wireless handheld communication device 300. A device 300 that is so configured is capable of transmitting data to and from a communication network 319 utilizing radio frequency signals. The wireless communication device 300 can be equipped to send voice signals as well as data information to the wireless network 319. The wireless communication device 300 is capable of transmitting textual data as well as other data including but not limited to graphical data, electronic files, and software.

Figure 8:
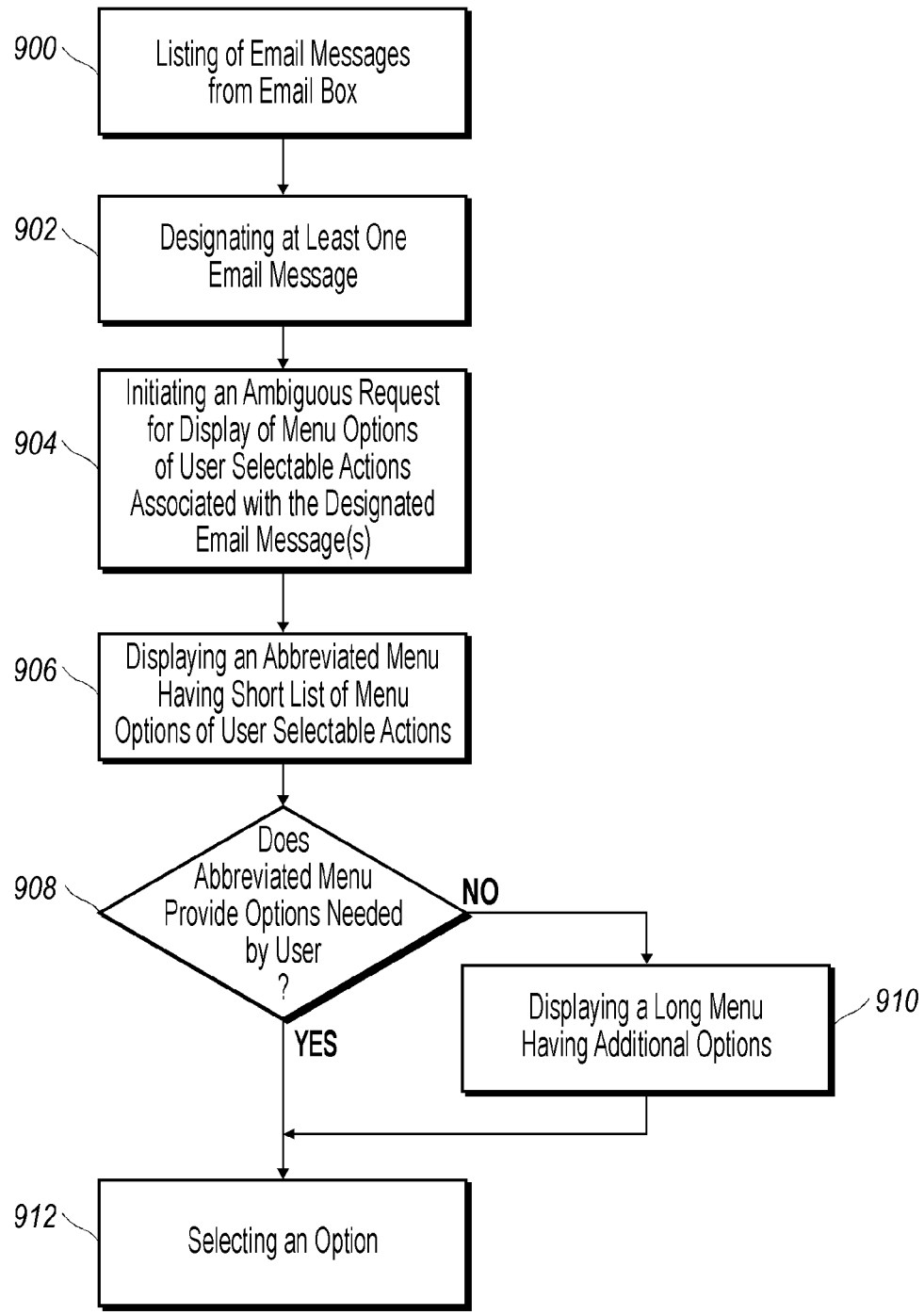
FIG. 8 further illustrates the hierarchical menu process depicted in FIG. 7.

Yet another embodiment takes the form of a method for causing, upon user request, the display of an abbreviated menu of user-selectable actions 1000 on a display screen 322 of the handheld electronic device 300 when a listing of messages from an email box is presented on the display screen 322 of the device 300 as depicted in FIG. 8. First, the method includes displaying a listing of email messages on the display screen of the handheld electronic device (block 900). This listing of email messages is associated with an email box that is user-accessible via the handheld electronic device 300. Next, the method includes designating at least one mail message utilizing an auxiliary user input device on the handheld electronic device (block 902). Once at least one email message has been designated, the method further involves initiating an ambiguous request for display of menu options of user-selectable actions associated with designated email message(s) (block 904). Furthermore, the method involves displaying an abbreviated menu having a short list of menu options (block 906). This short menu 624 as described above includes those options that have been assessed a higher probability for being user-selected than at least some of the user-selectable actions 1000 of the full menu 618. Thus, the short list 624 of menu options is a subset of a full menu 618 of options of user-selectable actions 1000 available relative to the email message(s) and the user selectable actions 1000 of the short list 624 of menu options having been assessed a higher probability for being user-selected than at least some of the user-selectable actions 1000 of the full menu 618 of options that are not included in the short list 624 of menu options.

In one embodiment, the short list 624 includes the following user-selectable actions 1000 available relative to the designated email message(s): (i) file to folder; (ii) mark opened/unopened; (iii) save; (iv) delete and optionally (v) full menu.

Additionally, the short menu 624 list can further be refined by having a plurality of email messages that are selected collectively and are signified as group of email messages by the user. Then a determination is made whether the abbreviated menu provides options needed by the user (block 908). If the options needed by the user are not displayed then a full (long) menu having additional options is displayed (910). Once the appropriate menu options are displayed (block 908, 910), the user chooses the desired option (block 912).

In another embodiment, the short list 624 of the method consists of a closed group of user-selectable actions available relative to the designated email message(s) including: (i) file to folder; (ii) mark opened/unopened; (iii) save and (iv) delete. In another example, the closed group further includes (v) full menu, for expanding the listing of available action.

In other embodiments, the method for causing display of a short menu also includes the various features described above in relation to the handheld device embodiments. These various features include dimensional options, communication options, auxiliary input options and short menu sizing as described above in relation to the handheld electronic device 300 embodiment.

Still another embodiment takes the form of a processing subsystem configured to be installed in a mobile communication device 300 comprising a user interface including a display 322 and a keyboard 332 having a plurality of input keys with which letters are associated. The processing subsystem serves as an operating system 408 for the incorporating device 300. The processing subsystem preferably includes a microprocessor 338 and a media storage device connected with other systems and subsystems 342 of the device 300. The microprocessor 338 can be any integrated circuit or the like that is capable of performing computational or control tasks. The media storage device can exemplarily include a flash memory 324, a hard drive, a floppy disk, RAM 326, ROM, and other similar storage media.

As stated above, the operating system 408 software controls operation of the incorporating mobile communication device 300. The operating software 408 is programmed to control operation of the handheld electronic device 300 and the control program is configured to process an ambiguous request for display of menu options of user-selectable actions 1000 associated with at least one designated email message of a plurality of email messages that are displayed on the device 300 based upon detection of a user menu request. Based on the detection of the user menu request, the microprocessor 338 displays an abbreviated menu having a short list 624 of menu options which is a subset of a full menu 618 of options of user-selectable actions 1000 of the short list 624 of menu options. The short list 624 of menu options have been assessed a higher probability for being user-selected than at least some of the user-selectable actions 1000 of the full menu 618 of options that are not included in the short list 624 of menu options.

In other embodiments, the processing subsystem also includes the various features described above in relation to the handheld device 300 embodiments. These various features include dimensional options, communication options, auxiliary input options and short menu sizing as described above in relation to the handheld electronic device 300 embodiment. Additionally, the options available from the short menu 624 are the same as those described above in relation to the method and handheld device 300 embodiments.

As intimated hereinabove, one of the more important aspects of the handheld electronic device 300 to which this disclosure is directed is its size. While some users will grasp the device 300 in both hands, it is intended that a predominance of users will cradle the device 300 in one hand in such a manner that input and control over the device 300 can be affected using the thumb of the same hand in which the device 300 is held, however it is appreciated that additional control can be effected by using both hands. As a handheld device 300 that is easy to grasp and desirably pocketable, the size of the device 300 must be kept relatively small. Of the device's dimensions, limiting its width is important for the purpose of assuring cradleability in a user's hand. Moreover, it is preferred that the width of the device 300 be maintained at less than ten centimeters (approximately four inches). Keeping the device 300 within these dimensional limits provides a hand cradleable unit that users prefer for its usability and portability. Limitations with respect to the height (length) of the device 300 are less stringent when considering hand-cradleability. Therefore, in order to gain greater size, the device 300 can be advantageously configured so that its height is greater than its width, but still remain easily supported and operated in one hand.

A potential problem is presented by the small size of the device 300 in that there is limited exterior surface area for the inclusion of user input and device output features. This is especially true for the "prime real estate" on the front face of the device 300, where it is most advantageous to include a display screen 322 that outputs information to the user. The display screen 322 is preferably located above a keyboard that is utilized for data entry into the device 300 by the user. If the screen 322 is provided below the keyboard 332, a problem occurs in that viewing the screen 322 is inhibited when the user is inputting data using the keyboard 332. Therefore it is preferred that the display screen 322 be above the input area, thereby solving the problem by assuring that the hands and fingers do not block the view of the screen 332 during data entry periods.

To facilitate textual data entry into the device 300, an alphabetic keyboard is provided. In one version, as exemplified in FIG. 9, a full alphabetic keyboard 332 is utilized in which there is one key per letter. In this regard, the associated letters can be advantageously organized in QWERTY, QWERTZ, AZERTY or Dvorak layouts, among others, thereby capitalizing on certain users' familiarity with these special letter orders. In order to stay within the bounds of the limited front surface area, however, each of the keys must be commensurately small when, for example, twenty-six keys must be provided in the instance of the English language.

An alternative configuration is to provide a reduced keyboard in which at least some of the keys have more than one letter associated therewith (see FIG. 1 for an example). This means that fewer keys are required which makes it possible for those fewer keys to each be larger than in the instance when a full keyboard is provided on a similarly dimensioned device. Some users will prefer the solution of the larger keys over the smaller ones, but it is necessary that software or hardware solutions be provided in order to discriminate which of the several associated letters the user intends based on a particular key actuation, a problem the full keyboard avoids.

Preferably, the character discrimination is accomplished utilizing disambiguation software included on the device 300. To accommodate software use on the device 300, a memory 324 and microprocessor 338 are provided within the body of the handheld unit for receiving, storing, processing, and outputting data during use. Therefore, the problem of needing a textual data input means is solved by the provision of either a full or reduced alphabetic keyboard 332 on the presently disclosed handheld electronic device 300. It should be further appreciated that the keyboard 332 can be alternatively provided on a touch sensitive screen in either a reduced or full format.

Keys, typically of a push-button or touchpad nature, perform well as data entry devices but present problems to the user when they must also be used to affect navigational control over a screen-cursor. In order to solve this problem, the present handheld electronic device 300 preferably includes an auxiliary input that acts as a cursor navigational tool and which is also exteriorly located upon the front face of the device 300. Its front face location is particularly advantageous because it makes the tool easily thumb-actuable like the keys of the keyboard. In a particularly useful embodiment, the navigational tool is a trackball 121 which is easily utilized to instruct two-dimensional screen cursor movement in substantially any direction, as well as act as an actuator when the ball of the trackball 121 is depressed like a button. The placement of the trackball 121 is preferably above the keyboard 332 and below the display screen 322; here, it avoids interference during keyboarding and does not block the user's view of the display screen 322 during use (See FIG. 1).

In some configurations, the handheld electronic device 300 may be standalone in that it does not connect to the "outside world." As discussed before, one example would be a PDA that stores such things as calendars and contact information but is not capable of synchronizing or communicating with other devices. In most situations such isolation will be viewed detrimentally in that synchronization is a highly desired characteristic of handheld devices today. Moreover, the utility of the device 300 is significantly enhanced when connectable within a communication system, and particularly when connectable on a wireless basis in a network 319 in which voice, text messaging, and other data transfer are accommodated.

As shown in FIG. 1, the handheld electronic device 300 is cradleable in the palm of a user's hand. The handheld device 300 is provided with a keyboard 332 to enter text data and place telephone calls and a display screen 322 for communicating information to the user. A connect/send key 605 is preferably provided to aid in the placement of a phone call. Additionally, a disconnect/end key 609 is provided. The send key 605 and end key 609 preferably are arranged in a row of keys including a auxiliary input device 328. Additionally, the row of keys, including the navigation tool, preferably has a menu key 606 and a back key or escape key 608 The menu key 606 is used to bring up a menu and the escape key 608 is used to return to the previous screen or previous menu selection.

The handheld electronic device 300 includes an input portion 604 and an output display portion. The output display portion can be a display screen 322, such as an LCD or other similar display device.

The keyboard 332 includes a plurality of keys that can be of a physical nature such as actuable buttons or they can be of a software nature, typically constituted by virtual representations of physical keys on a display screen 322 (referred to herein as "software keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space. Input commands and functions can include such things as delete, backspace, moving a cursor up, down, left or right, initiating an arithmetic function or command, initiating a command or function specific to an application program or feature in use, initiating a command or function programmed by the user and other such commands and functions that are well known to those persons skilled in the art. Specific keys or other types of input devices can be used to navigate through the various applications and features thereof. Further, depending on the application 358 or feature in use, specific keys can be enabled or disabled.

In the case of physical keys, all or a portion of the plurality of keys have one or more indicia, representing character(s), command(s), and/or function(s), displayed at their top surface and/or on the surface of the area adjacent the respective key. In the instance where the indicia of a key's function is provided adjacent the key, the indicia can be printed on the device cover beside the key, or in the instance of keys located adjacent the display screen 322. Additionally, current indicia for the key may be temporarily shown nearby the key on the screen 322.

In the case of software keys, the indicia for the respective keys are shown on the display screen 322, which in one embodiment is enabled by touching the display screen 322, for example, with a stylus to generate the character or activate the indicated command or function. Some examples of display screens 322 capable of detecting a touch include resistive, capacitive, projected capacitive, infrared and surface acoustic wave (SAW) touchscreens.

Physical and software keys can be combined in many different ways as appreciated by those skilled in the art. In one embodiment, physical and software keys are combined such that the plurality of enabled keys for a particular application or feature of the handheld electronic device 300 is shown on the display screen 322 in the same configuration as the physical keys. Using this configuration, the user can select the appropriate physical key corresponding to what is shown on the display screen 322. Thus, the desired character, command or function is obtained by depressing the physical key corresponding to the character, command or function displayed at a corresponding position on the display screen 322, rather than touching the display screen 322.

Figures 9, 10A:
FIG. 9 is a front view of an exemplary handheld electronic device including a full QWERTY keyboard.
FIG. 10a illustrates an exemplary QWERTY keyboard layout.

The various characters, commands and functions associated with keyboard typing in general are traditionally arranged using various conventions. The most common of these in the United States, for instance, is the QWERTY keyboard layout. Others include the QWLRTZ, AZERTY, and Dvorak keyboard configurations. The QWERTY keyboard layout is the standard English-language alphabetic key arrangement 44a shown in FIG. 10a. The QWERTZ keyboard layout is normally used in German-speaking regions; this alphabetic key arrangement 44b is shown in FIG. 10b. The AZERTY keyboard layout 44c is normally used in French-speaking regions and is shown in FIG. 10c. The Dvorak keyboard layout was designed to allow typists to type faster; this alphabetic key arrangement 44d is shown in FIG. 10d.

Alphabetic key arrangements are often presented along with numeric key arrangements. Typically, the numbers 1-9 and 0 are positioned in the row above the alphabetic keys 44, as shown in FIG. 10a-d. Alternatively, the numbers share keys with the alphabetic characters, such as the top row of the QWERTY keyboard (see FIG. 9 for an example). Yet another exemplary numeric key arrangement is shown in FIG. 11, where a "ten-key" style numeric keypad 46 is provided on a separate set of keys that is spaced from the alphabetic/numeric key arrangement 44. The ten-key styled numeric keypad 46 includes the numbers "7", "8", "9" arranged in a top row, "4", "5", "6" arranged in a second row, "1", "2", "3" arranged in a third row, and "0" in a bottom row. Further, a numeric phone key arrangement 42 is exemplarily illustrated in FIG. 12.

As shown in FIG. 12, the numeric phone key arrangement 42 may also utilize a surface treatment on the surface of the center "5" key. This surface treatment is configured such that the top surface of the key is distinctive from the surface of other keys. Preferably the surface treatment is in the form of a raised bump or recessed dimple 43. Alternatively, raised bumps may be positioned on the housing around the "5" key and do not necessarily have to be positioned directly on the key.

It is desirable for handheld electronic devices 300 to include a combined text-entry keyboard and a telephony keyboard. Examples of such mobile communication devices 300 include mobile stations, cellular telephones, wireless personal digital assistants (PDAs), two-way paging devices, and others. Various keyboards are used with such devices and can be termed a full keyboard, a reduced keyboard, or phone key pad.

In embodiments of a handheld electronic device 300 having a full keyboard, the alphabetic characters are singly associated with the plurality of physical keys. Thus, in an English-language keyboard of this configuration, there are at least 26 keys in the plurality so that there is at least one key for each letter.

A device 300 incorporating a full keyboard for the alphabetic characters is shown in FIG. 9. The device shown in FIG. 9 incorporates numeric keys in a single row. FIGS. 12 and 13 both feature numeric keys arranged according to the ITU Standard E.161 form. In addition, FIG. 13 also incorporates alphabetic characters according to the ITU Standard E.161 layout as well.

As intimated above, in order to further reduce the size of a handheld electronic device 300 without making the physical keys or software keys too small, some handheld electronic devices 300 use a reduced keyboard, where more than one character/command/function is associated with each of at least a portion of the plurality of keys. This results in certain keys being ambiguous since more than one character is represented by or associated with the key, even though only one of those characters is typically intended by the user when activating the key.

Thus, certain software usually runs on the processor 338 of these types of handheld electronic devices 300 to determine or predict what letter or word has been intended by the user. Some examples of software include predictive text routines which typically include a disambiguation engine and/or predictive editor application. The software preferably also has the ability to recognize character letter sequences that are common to the particular language, such as, in the case of English, words ending in "ing." Such systems can also "learn" the typing style of the user making note of frequently used words to increase the predictive aspect of the software. Other types of predictive text computer programs may be utilized with the reduced keyboard arrangements described herein, without limitation. Some specific examples include the multi-tap method of character selection and "text on nine keys".

The keys of reduced keyboards are laid out with various arrangements of characters, commands and functions associated therewith. In regards to alphabetic characters, the different keyboard layouts identified above are selectively used based on a user's preference and familiarity; for example, the QWERTY keyboard layout is most often used by English speakers who have become accustomed to the key arrangement.

FIG. 1 shows a handheld electronic device 300 that carries an example of a reduced keyboard using the QWERTY keyboard layout on a physical keyboard array of twenty keys comprising five columns and four rows. Fourteen keys are used for alphabetic characters and ten keys are used for numbers. Nine of the ten numbers share a key with alphabetic characters. The "space" key and the number "0" share the same key, which is centered on the device and centered below the remainder of the numbers on the keyboard 332. While in other embodiments, the number "0" may be located on other keys. Many of the keys have different sizes than the other keys, and the rows are non-linear. In particular, the keys in the middle column 64 are wider than keys in the outer columns 60, 62, 66 and 68. To readily identify the phone user interface (the second user interface), the numeric phone keys 0-9 include a color scheme that is different from that of the remaining keys associated with the QWERTY key arrangement. As exemplified in FIG. 1, a color scheme of the numeric phone keys has a two tone appearance, with the upper portion of the numeric keys being a first color and the lower portion of the numeric keys being a second color. The first color may be lighter than the second color, or darker than the second color.

Another embodiment of a reduced alphabetic keyboard is found on a standard phone keypad 42. Most handheld electronic devices 300 having a phone key pad 42 also typically include alphabetic key arrangements overlaying or coinciding with the numeric keys as shown in FIG. 13. Such alphanumeric phone keypads are used in many, if not most, traditional handheld telephony mobile communication devices such as cellular handsets.

As described above, the International Telecommunications Union ("ITU") has established phone standards for the arrangement of alphanumeric keys. The standard phone numeric key arrangement shown in FIG. 12 (no alphabetic letters) and 13 (with alphabetic letters) corresponds to ITU Standard E.161, entitled "Arrangement of Digits, Letters, and Symbols on Telephones and Other Devices That Can Be Used for Gaining Access to a Telephone Network." This standard is also known as ANSI TI.703-1995/1999 and ISO/IEC 9995-8:1994. Regarding the numeric arrangement, it can be aptly described as a top-to-bottom ascending order three-by-three-over-zero pattern.

Exemplary embodiments have been described hereinabove regarding both handheld electronic devices 300, as well as the communication networks 319 within which they cooperate. It should be appreciated, however, that a focus of the present disclosure is the enablement of a user of such wireless handheld electronic devices 300 to implement user control interface menus to overcome the various disadvantages with conventional dropdown-style hierarchical menus. The specific features and acts are disclosed as exemplary forms of implementing the disclosed solution.

What is claimed is:

1. A method for causing, upon user request, the display of an abbreviated menu of user-selectable actions on a display screen of a handheld electronic device when a listing of messages in an email box is presented on the display screen of the device, said method comprising:

displaying a listing of email messages on a display screen of a handheld electronic device, said listing of email messages being associated with an email box that is user-accessible via the handheld electronic device;

designating at least one email message utilizing an auxiliary user input device on the handheld electronic device;

initiating an ambiguous request for display of menu options of user-selectable actions associated with the at least one designated email message; and displaying an abbreviated menu having a short list of menu options which is a subset of a full menu of options of user-selectable actions available relative to the at least one designated email message and the user-selectable actions of said short list of menu options having been assessed a higher probability for being user-selected than at least some of the user-selectable actions of the full menu of options that are not included in said short list of menu options; wherein said short list of menu options comprises the following user-selectable actions available relative to the at least one designated email message: (i) file to folder; (ii) mark opened/unopened; (iii) save and (iv) delete.

2. The method of claim 1, further comprising said short list of menu options consisting of the following user-selectable actions available relative to the at least one designated email message: (i) file to folder; (ii) mark opened/unopened; (iii) save and (iv) delete.

3. The method of claim 1, further comprising said short list of menu options consisting of the following user-selectable actions available relative to the at least one designated email message: (i) file to folder; (ii) mark opened/unopened; (iii) save; (iv) delete and (v) full menu.

4. The method of claim 3, wherein said at least one email message is a plurality of email messages collectively signified as a group of email messages.

5. The method of claim 4, further comprising causing said initiation of the ambiguous request for display of menu options of user-selectable actions by actuating the auxiliary user input device on the handheld electronic device.

6. The method of claim 5, wherein the auxiliary user input device is a trackball.

7. The method of claim 3, wherein the short menu fills a substantial entirety of the display screen.

8. The method of claim 3, wherein said handheld electronic device is a wireless handheld communication device that transmits data to, and receives data from a communication network utilizing radio frequency signals.

9. The method of claim 3, wherein said handheld electronic device is sized to be cradled in the palm of a user's hand.

10. The method of claim 3, wherein said handheld electronic device is longer than wide.

11. The method of claim 10, wherein the width of said handheld electronic device measures between approximately two and approximately three inches thereby facilitating the device being palm cradled.

12. The method of claim 3, wherein said handheld electronic device further comprises a keyboard suitable for accommodating textual input to the handheld electronic device and the auxiliary user input device is located essentially between the keyboard and the display screen of the handheld electronic device.

13. A handheld electronic device programmed to display, upon user request, an abbreviated menu of user-selectable actions on a display screen of the device when a listing of messages associated with an email box is presented on the display screen of the device, said handheld electronic device comprising:

a display screen on which a listing of email messages is displayed, said listing of email messages being associated with an email box that is user-accessible via the handheld electronic device and at least one of the email messages is user-designated for action to be taken relative thereto;

a keyboard located below said display screen and configured to accommodate textual input to the handheld electronic device; and a microprocessor having a control program associated therewith for controlling operation of said handheld electronic device, said control program configured to process an ambiguous request for display of menu options of user-selectable actions associated with the at least one designated email message based upon detection of a user menu request, and, based on said detection of the user menu request, said microprocessor displays an abbreviated menu having a short list of menu options which is a subset of a full menu of options of user-selectable actions available relative to the at least one designated email message and the user-selectable actions of said short list of menu options having been assessed a higher probability for being user-selected than at least some of the user-selectable actions of the full menu of options that are not included in said short list of menu options; wherein said short list of menu options comprises the following user-selectable actions available relative to the at least one designated email message: (i) file to folder; (ii) mark opened/unopened; (iii) save and (iv) delete.

14. The handheld electronic device of claim 13, further comprising said short list of menu options consisting of the following user-selectable actions available relative to the at least one designated email message: (i) file to folder; (ii) mark opened/unopened; (iii) save and (iv) delete.

15. The handheld electronic device of claim 13, further comprising said short list of menu options consisting of the following user-selectable actions available relative to the at least one designated email message: (i) file to folder; (ii) mark opened/unopened; (iii) save; (iv) delete and (v) full menu.

16. The handheld electronic device of claim 15, wherein said at least one email message is a plurality of email messages collectively signified as a group of email messages.

17. The handheld electronic device of claim 16, further comprising:
said auxiliary user input device is a trackball and initiation of the ambiguous request for display of menu options of user-selectable actions is made by actuating the trackball; and
said handheld electronic device is a wireless handheld communication device that transmits data to, and receives data from a communication network utilizing radio frequency signals.

18. The handheld electronic device of claim 15, further comprising a navigation tool located essentially between the keyboard and the display screen of the handheld electronic device.

19. The handheld electronic device of claim 15, wherein said handheld electronic device is longer than wide and the width of said handheld electronic device measures between approximately two and approximately three inches thereby facilitating the device being palm cradled.

20. A processing subsystem configured to be installed in a handheld electronic device comprising a user interface including a display and a keyboard having a plurality of input keys with which letters are associated, said processing subsystem comprising:
operating system software that controls operation of an incorporating handheld electronic device and said operating system software is programmed to operating system software of said handheld electronic device, said control program is configured to process an ambiguous request for display of menu options of user-selectable actions associated with at least one designated email message of a plurality of email messages that are displayed on the device based upon detection of a user menu request, and, based on said detection of the user menu request, said microprocessor displays an abbreviated menu having a short list of menu options which is a subset of a full menu of options of user-selectable actions available relative to the at least one designated email message and the user-selectable actions of said short list of menu options having been assessed a higher probability for being user-selected than at least some of the user-selectable actions of the full menu of options that are not included in said short list of menu options; wherein said short list of menu options comprises the following user-selectable actions available relative to the at least one designated email message: (i) file to folder; (ii) mark opened/unopened; (iii) save and (iv) delete.

\* \* \* \* \*